United States Patent
Chai et al.

(10) Patent No.: US 10,588,096 B2
(45) Date of Patent: Mar. 10, 2020

(54) POWER CONTROL METHOD AND TERMINAL DEVICE

(71) Applicant: HUAWEI TECHNOLOGIES CO., LTD., Shenzhen, Guangdong (CN)

(72) Inventors: Li Chai, Shenzhen (CN); Xun Tang, Beijing (CN); Jinhua Miao, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 16/368,608

(22) Filed: Mar. 28, 2019

(65) Prior Publication Data

US 2019/0223117 A1   Jul. 18, 2019

Related U.S. Application Data

(63) Continuation of application No. PCT/CN2017/103995, filed on Sep. 28, 2017.

(30) Foreign Application Priority Data

Sep. 29, 2016 (CN) .......................... 2016 1 0871474

(51) Int. Cl.
   *H04W 52/36* (2009.01)
   *H04W 52/32* (2009.01)
(52) U.S. Cl.
   CPC ....... *H04W 52/365* (2013.01); *H04W 52/325* (2013.01)
(58) Field of Classification Search
   CPC .................................................. H04W 52/365
   See application file for complete search history.

(56) References Cited

U.S. PATENT DOCUMENTS

| | | | |
|---|---|---|---|
| 2012/0213149 A1* | 8/2012 | Chakraborty | ....... H04W 52/365 370/328 |
| 2013/0208675 A1 | 8/2013 | Shen et al. | |

(Continued)

FOREIGN PATENT DOCUMENTS

| | | |
|---|---|---|
| CN | 101340622 A | 1/2009 |
| CN | 101925105 A | 12/2010 |
| CN | 102378239 A | 3/2012 |

OTHER PUBLICATIONS

International Search Report dated Nov. 30, 2017 in corresponding International Application No. PCT/CN2017/103995.

(Continued)

*Primary Examiner* — David Bilodeau
(74) *Attorney, Agent, or Firm* — Leydig, Voit & Mayer, Ltd.

(57) ABSTRACT

Embodiments of the present invention disclose a power control method and a terminal device. The terminal device receives configuration information from a base station, where the configuration information includes an uplink power control parameter; estimates, according to the uplink power control parameter, a transmit power that is on an uplink shared channel and that is of a beam set in which a terminal device is located; calculates, according to a maximum transmit power of the terminal device and the transmit power that is on the uplink shared channel and that corresponds to the beam set in which the terminal device is located, a power headroom of the beam set in which the terminal device is located; and generates a power headroom report according to the power headroom of the beam set in which the terminal device is located, and sends the power headroom report to the base station.

14 Claims, 8 Drawing Sheets

(56) References Cited

U.S. PATENT DOCUMENTS

2014/0211647 A1    7/2014  Li
2015/0382205 A1*  12/2015  Lee .................... H04B 7/0417
                                                   370/329
2017/0207845 A1*   7/2017  Moon ................... H04B 7/088
2017/0332333 A1*  11/2017  Santhanam .............. H04L 5/14

OTHER PUBLICATIONS

3GPP TS 36.331 V13.2.0 (Jun. 2016), 3rd Generation Partnership Project; Technical Specification Group Radio Access Network; Evolved Universal Terrestrial Radio Access (E-UTRA); Radio Resource Control (RRC); Protocol specification (Release 13), pp. 1-623.

International Search Report, dated Nov. 30, 2017, in International Application No. PCT/CN2017/103995 (4 pp.)

Written Opinion of the International Searching Authority, dated Nov. 30, 2017, in International Application No. PCT/CN2017/103995 (7 pp.).

* cited by examiner

Table 1

| $B_7$ | $B_6$ | $B_5$ | $B_4$ | $B_3$ | $B_2$ | $B_1$ | R |
|---|---|---|---|---|---|---|---|
| R | R | \multicolumn{6}{c|}{$PH_7$} |
| R | R | \multicolumn{6}{c|}{$PH_6$} |
| R | R | \multicolumn{6}{c|}{$PH_5$} |
| R | R | \multicolumn{6}{c|}{$PH_4$} |
| R | R | \multicolumn{6}{c|}{$PH_3$} |
| R | R | \multicolumn{6}{c|}{$PH_2$} |
| R | R | \multicolumn{6}{c|}{$PH_1$} |

FIG. 6

Table 2:

| $C_7$ | $C_6$ | $C_5$ | $C_4$ | $C_3$ | $C_2$ | $C_1$ | R |
|---|---|---|---|---|---|---|---|
| $B_7$ | $B_6$ | $B_5$ | $B_4$ | $B_3$ | $B_2$ | $B_1$ | $B_0$ |
| P | V | \multicolumn{6}{c|}{PH (Type2, PCell)} |
| R | R | \multicolumn{6}{c|}{$P_{CMAX_c}$ 1} |
| P | V | \multicolumn{6}{c|}{PH (Type1, PCell)} |
| R | R | \multicolumn{6}{c|}{$P_{CMAX_c}$ 2} |
| $B_7$ | $B_6$ | $B_5$ | $B_4$ | $B_3$ | $B_2$ | $B_1$ | $B_0$ |
| P | V | \multicolumn{6}{c|}{PH (Type1, SCell1)} |
| R | R | \multicolumn{6}{c|}{$P_{CMAX_c}$ 3} |
| \multicolumn{8}{c|}{...} |
| $B_7$ | $B_6$ | $B_5$ | $B_4$ | $B_3$ | $B_2$ | $B_1$ | $B_0$ |
| P | V | \multicolumn{6}{c|}{PH (Type1, SCell n)} |
| R | R | \multicolumn{6}{c|}{$P_{CMAX_c}$ m} |

FIG. 7

Table 3

| C₇ | C₆ | C₅ | C₄ | C₃ | C₂ | C₁ | R |
|---|---|---|---|---|---|---|---|
| B₇ | B₆ | B₅ | B₄ | B₃ | B₂ | B₁ | R |
| P | V | \multicolumn{6}{c}{PH (Type 2, PCell, beam k)} |
| R | R | \multicolumn{6}{c}{$P_{CMAX,c}$ 1, 1} |
| P | V | \multicolumn{6}{c}{PH (Type 1, PCell, beam k)} |
| R | R | \multicolumn{6}{c}{$P_{CMAX,c}$ 1, 2} |

...

| P | V | \multicolumn{6}{c}{PH (Type 1, SCell n)} |
|---|---|---|---|---|---|---|---|
| R | R | \multicolumn{6}{c}{$P_{CMAX,c}$ 1, k} |
| B₇ | B₆ | B₅ | B₄ | B₃ | B₂ | B₁ | R |
| P | V | \multicolumn{6}{c}{PH (Type 2, PCell)} |
| R | R | \multicolumn{6}{c}{$P_{CMAX,c}$ 2, 1} |
| P | V | \multicolumn{6}{c}{PH (Type 1, PCell)} |
| R | R | \multicolumn{6}{c}{$P_{CMAX,c}$ 2, 2} |

...

| P | V | PH (Type 1, SCell n) |
|---|---|---|
| R | R | $P_{CMAX,c}$ 2, k |

...
...

| B₇ | B₆ | B₅ | B₄ | B₃ | B₂ | B₁ | R |
|---|---|---|---|---|---|---|---|
| P | V | \multicolumn{6}{c}{PH (Type 2, PCell)} |
| R | R | \multicolumn{6}{c}{$P_{CMAX,c}$ m, 1} |
| P | V | \multicolumn{6}{c}{PH (Type 1, PCell)} |
| R | R | \multicolumn{6}{c}{$P_{CMAX,c}$ m, 2} |

...

| P | V | PH (Type 1, SCell n) |
|---|---|---|
| R | R | $P_{CMAX,c}$ m, k |

FIG. 8

Table 4

| C7 | C6 | C5 | C4 | C3 | C2 | C1 | R |
|----|----|----|----|----|----|----|---|
| B7 | B6 | B5 | B4 | B3 | B2 | B1 | R |
| P | V | PH (Type 2, PCell, beam k) | | | | | |
| R | R | $P_{CMAX,c}$ 1 | | | | | |
| P | V | PH (Type 1, PCell, beam k) | | | | | |
| R | R | $P_{CMAX,c}$ 2 | | | | | |
| B7 | B6 | B5 | B4 | B3 | B2 | B1 | R |
| P | V | PH (Type 1, SCell 1, beam k) | | | | | |
| R | R | $P_{CMAX,c}$ 3 | | | | | |

...

| B7 | B6 | B5 | B4 | B3 | B2 | B1 | R |
|----|----|----|----|----|----|----|---|
| P | V | PH (Type 1, SCell n, beam k) | | | | | |
| R | R | PCMAX, c m | | | | | |

FIG. 9

Table 5

| C₇ | C₆ | C₅ | C₄ | C₃ | C₂ | C₁ | R |
|----|----|----|----|----|----|----|---|
| B₇ | B₆ | B₅ | B₄ | B₃ | B₂ | B₁ | R |
| P | V | PH (Type 2, PCell, beam k) ||||||
| R | R | P$_{CMAX,c}$ 1 ||||||
| P | V | PH (Type 1, PCell, beam k) ||||||
| R | R | P$_{CMAX,c}$ 2 ||||||
| B₇ | B₆ | B₅ | B₄ | B₃ | B₂ | B₁ | R |
| P | V | PH (Type 2, PUCCH, SCell1, beam k) ||||||
| R | R | P$_{CMAX,c}$ 3 ||||||
| P | V | PH (Type 2, PUCCH, SCell2, beam k) ||||||
| R | R | P$_{CMAX,c}$ 4 ||||||
| B₇ | B₆ | B₅ | B₄ | B₃ | B₂ | B₁ | R |
| P | V | PH (Type 1, SCell 1, beam k) ||||||
| R | R | P$_{CMAX,c}$ 5 ||||||

...

| B₇ | B₆ | B₅ | B₄ | B₃ | B₂ | B₁ | R |
|----|----|----|----|----|----|----|---|
| P | V | PH (Type 1, SCell n, beam k) ||||||
| R | R | P$_{CMAX,c}$ m ||||||

FIG. 10

POWER CONTROL METHOD AND TERMINAL DEVICE

CROSS-REFERENCE TO RELATED APPLICATIONS

This application is a continuation of International Application No. PCT/CN2017/103995, filed on Sep. 28, 2017, which claims priority to Chinese Patent Application No. 201610871474.2, filed on Sep. 29, 2016. The disclosures of the aforementioned applications are hereby incorporated by reference in their entireties.

TECHNICAL FIELD

The present invention relates to the field of mobile communications technologies, and in particular, to a power control method and a terminal device.

BACKGROUND

To enable an eNodeB to dynamically allocate an appropriate resource to a terminal, the terminal needs to report power headroom information of the terminal to the eNodeB. The eNodeB adjusts a current transmit power of a terminal device according to a power headroom report (Power headroom report, PHR for short). If a power headroom report sent by a terminal to a base station is inaccurate, a scheduling resource allocated by the base station to the terminal is inappropriate, further causing problems such as increased interference between terminals, inadequate resource scheduling and a reduced uplink throughput.

To resolve the foregoing problems, in the prior art, a terminal calculates a power headroom (Power headroom, PH for short), a transmit power on an uplink shared channel, and a transmit power on a physical uplink control channel (Physical Uplink Control Channel, PUCCH for short) based on a downlink path loss of a cell-specific reference signal (Cell Reference Signal, CRS for short) of a serving cell and other related parameters, and reports a power headroom report to a base station.

However, as mobile broadband develops rapidly and smartphones become popular, global mobile data traffic reaches a compound annual growth rate up to 67%. Moreover, distribution of network traffic is extremely uneven, and capacity requirements in hot spot areas grow explosively. Network coverage, spectrum utilization, and the like that can be implemented by an existing low-band network can no longer meet user requirements. Therefore, future 5G networks will be established at a high band up to 100G. However, when the prior art (in a current LTE system, cell coverage is omnidirectional antenna coverage) is used to perform high-band networking, a series of problems occur, such as small network coverage, high power consumption, a high path loss, low spectrum efficiency, and a low system capacity. Consequently, at the high-frequency networking stage, it is excessively difficult to implement a method in which a terminal calculates a power headroom, a transmit power on an uplink shared channel, a transmit power on a physical uplink control channel, and the like according to a downlink path loss of a CRS of a serving cell and other related parameters. Therefore, at the high-frequency networking stage, a problem that urgently needs to be resolved is to find a method for calculating a power headroom, a transmit power on an uplink shared channel, and a transmit power on a physical uplink control channel, and for sending a power headroom report to a base station, so that the base station adjusts a transmit power on a terminal device side according to the power headroom report.

SUMMARY

Embodiments of the present invention provide a power control method and a terminal device.

According to a first aspect, the present invention provides a power control method. The method includes: receiving configuration information sent by a base station, where the configuration information includes an uplink power control parameter;

estimating, according to the uplink power control parameter, a transmit power that is on an uplink shared channel and that is of a beam set in which a terminal device is located, where the beam set includes n beams, and n is a positive integer greater than or equal to 1;

calculating, according to a maximum transmit power of the terminal device and the transmit power that is on the uplink shared channel and that corresponds to the beam set in which the terminal device is located, a power headroom of the beam set in which the terminal device is located; and generating a power headroom report according to the power headroom of the beam set in which the terminal device is located, and sending the power headroom report to the base station.

In an optional implementation, after the receiving configuration information sent by a base station, the method further includes:

estimating, according to the uplink power control parameter, a transmit power that is on a physical uplink control channel and that corresponds to the beam set in which the terminal device is located.

In another optional implementation, when it is determined that the terminal device sends the uplink shared channel and the physical uplink control channel to the base station at the same time, the method further includes: calculating, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located.

In still another optional implementation, a manner of the calculating, according to a maximum transmit power of the terminal device and the transmit power that is on the uplink shared channel and that corresponds to the beam set in which the terminal device is located, a power headroom of the beam set in which the terminal device is located includes:

sequentially calculating, according to the maximum transmit power of the terminal device and a transmit power that is on the uplink shared channel and that is of a $p^{th}$ beam in the beam set, a power headroom of the $p^{th}$ beam in the beam set, until power headrooms of all beams in the beam set have been calculated, where p is a positive integer greater than or equal to 1 and less than or equal to n; or sequentially calculating, according to the maximum transmit power of the terminal device and a transmit power that is on the uplink shared channel and that is of a $q^{th}$ group of beams of k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

In yet another optional implementation, a manner of the calculating, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located includes:

sequentially calculating, according to the maximum transmit power of the terminal device, a transmit power that is on the uplink shared channel and that is of a $p^{th}$ beam in the beam set, and a transmit power that is on the physical uplink control channel and that is of the $p^{th}$ beam in the beam set, a power headroom of the $p^{th}$ beam in the beam set, until power headrooms of all beams in the beam set have been calculated, where p is a positive integer greater than or equal to 1 and less than or equal to n; or sequentially calculating, according to the maximum transmit power of the terminal device, a transmit power that is on the uplink shared channel and that is of a $q^{th}$ group of beams of k groups of beams, and a transmit power that is on the physical uplink control channel and that is of the $q^{th}$ group of beams of the k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

According to a second aspect, the present invention provides a terminal device. The terminal device includes:

a receiving module, configured to receive configuration information sent by a base station, where the configuration information includes an uplink power control parameter;

a processing module, configured to: estimate, according to the uplink power control parameter, a transmit power that is on an uplink shared channel and that is of a beam set in which the terminal device is located, where the beam set includes n beams, and n is a positive integer greater than or equal to 1;

calculate, according to a maximum transmit power of the terminal device and the transmit power that is on the uplink shared channel and that corresponds to the beam set in which the terminal device is located, a power headroom of the beam set in which the terminal device is located; and generate a power headroom report according to the power headroom of the beam set in which the terminal device is located; and a sending module, configured to send the power headroom report to the base station.

In an optional implementation, a transmit power that is on a physical uplink control channel and that corresponds to the beam set in which the terminal device is located is estimated according to the uplink power control parameter.

In another optional implementation, the processing module is further configured to: determine whether the terminal device sends the uplink shared channel and the physical uplink control channel to the base station at the same time; and when determining that the terminal device sends the uplink shared channel and the physical uplink control channel to the base station at the same time, calculate, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located.

In still another optional implementation, a manner of the calculating, by the processing module according to a maximum transmit power of the terminal device and the transmit power that is on the uplink shared channel and that corresponds to the beam set in which the terminal device is located, a power headroom of the beam set in which the terminal device is located includes:

sequentially calculating, according to the maximum transmit power of the terminal device and a transmit power that is on the uplink shared channel and that is of a $p^{th}$ beam in the beam set, a power headroom of the $p^{th}$ beam in the beam set, until power headrooms of all beams in the beam set have been calculated, where p is a positive integer greater than or equal to 1 and less than or equal to n; or sequentially calculating, according to the maximum transmit power of the terminal device and a transmit power that is on the uplink shared channel and that is of a $q^{th}$ group of beams of k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

In yet another optional implementation, a manner of the calculating, by the processing module according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located includes:

sequentially calculating, according to the maximum transmit power of the terminal device, a transmit power that is on the uplink shared channel and that is of a $p^{th}$ beam in the beam set, and a transmit power that is on the physical uplink control channel and that is of the $p^{th}$ beam in the beam set, a power headroom of the $p^{th}$ beam in the beam set, until power headrooms of all beams in the beam set have been calculated, where p is a positive integer greater than or equal to 1 and less than or equal to n; or sequentially calculating, according to the maximum transmit power of the terminal device, a transmit power that is on the uplink shared channel and that is of a $q^{th}$ group of beams of k groups of beams, and a transmit power that is on the physical uplink control channel and that is of the $q^{th}$ group of beams of the k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

Based on the foregoing technical solutions, by means of the power control method and the terminal device provided in the embodiments of the present invention, a transmit power on an uplink shared channel, a transmit power on a physical uplink control channel, and a power headroom of a beam set are calculated in a beam space, and a power headroom report is generated; and the power headroom report is sent to the base station, so that the base station adjusts a power on a terminal device side according to the power headroom report. Based on the foregoing method, problems such as increased interference between terminal devices, inadequate resource scheduling and a reduced uplink throughput that are caused by inaccurate power control can be avoided.

BRIEF DESCRIPTION OF DRAWINGS

FIG. 6 is a table illustrating a PHR report according to an embodiment;

FIG. 7 is a table illustrating a power headroom report according to an embodiment;

FIG. 8 is a table illustrating a power headroom report according to an embodiment;

FIG. 9 is a table illustrating a power headroom report according to an embodiment; and FIG. 10 is a table illustrating a power headroom report according to another embodiment.

DESCRIPTION OF EMBODIMENTS

The technical solutions of the present invention are further described below in detail with reference to the accompanying drawings and embodiments:

To make the objectives, technical solutions, and advantages of the embodiments of the present invention clearer, the following clearly and completely describes the technical solutions in the embodiments of the present invention with reference to the accompanying drawings in the embodiments of the present invention. Apparently, the described embodiments are some but not all of the embodiments of the present invention. All other embodiments obtained by a person of ordinary skill in the art based on the embodiments of the present invention without creative efforts shall fall within the protection scope of the present invention.

Figure 1:
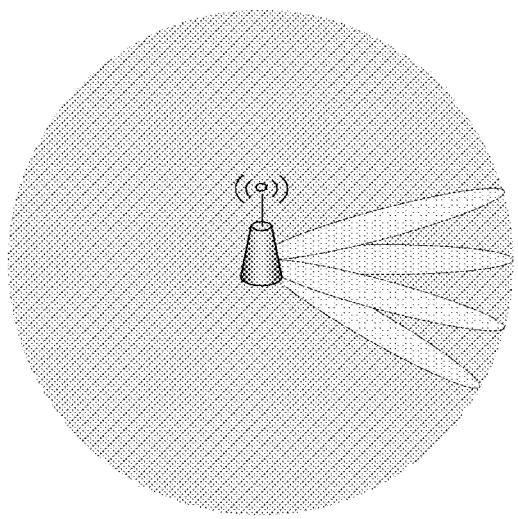
FIG. 1 is a schematic diagram showing that beam sets form a cell according to an embodiment of the present invention.
Figure 2:
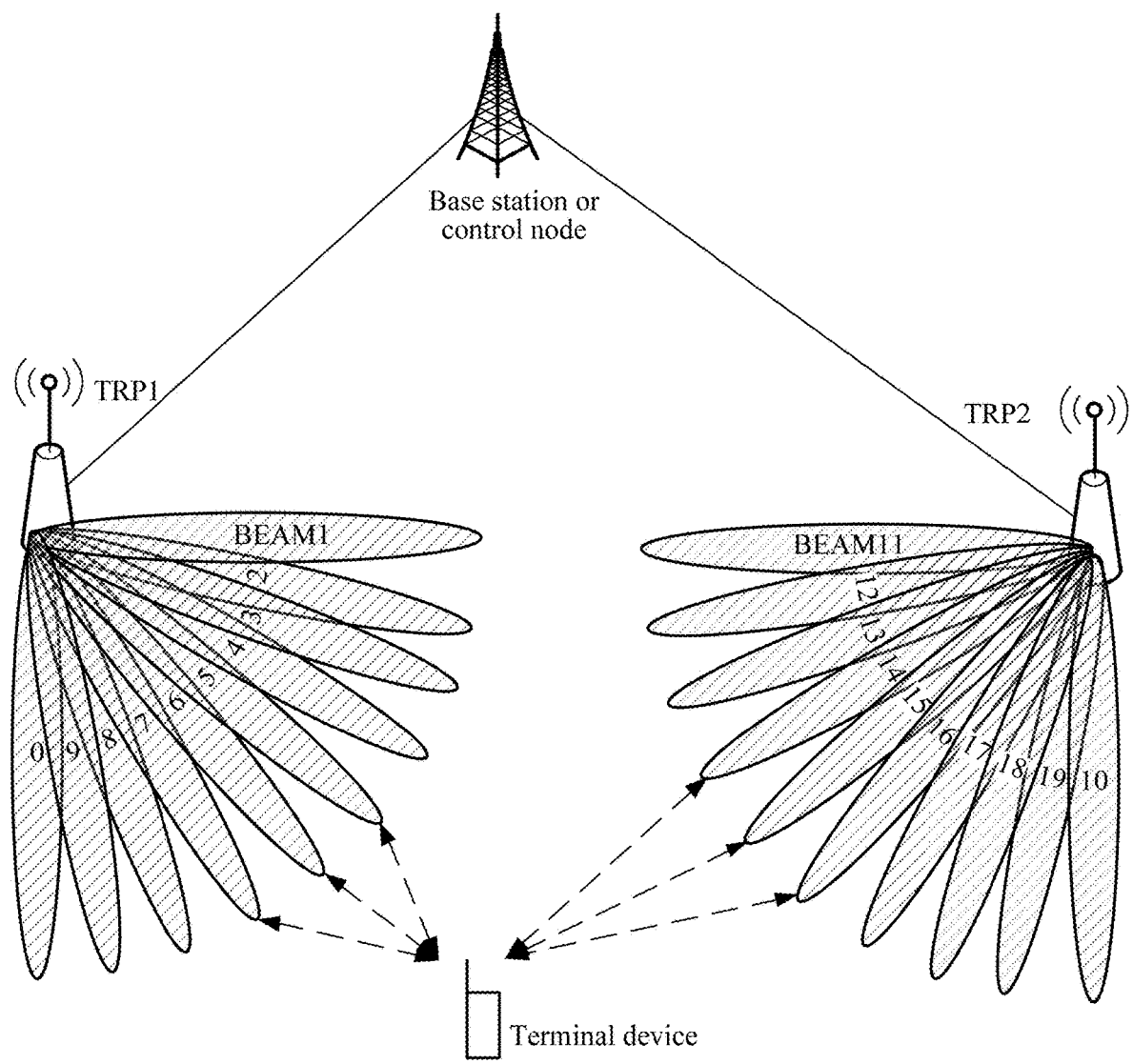
FIG. 2 is a schematic diagram of implementing communication and interaction between a base station and a terminal device by using beams according to an embodiment of the present invention.

To help operators to maximize the use of existing site and spectrum resources and improve network coverage and capacity, in the present invention, an extremely precise user-level ultra-narrow beam is formed by using an active antenna array technology and combining an innovative pilot signal design and a high-precision estimation algorithm for a user channel, so as to direct energy at a user location, improve network coverage capability, and reduce power consumption of a radio network. An effect of improving network coverage capability is particularly significant in high/middle frequency networks. A beam set may be formed of multiple user-level ultra-narrow beams. Specifically, as shown in FIG. 1, FIG. 1 is a schematic diagram of beam sets forming a cell according to an embodiment of the present invention. A terminal device may simultaneously receive a signal sent by using multiple beams. Specifically, as shown in FIG. 2, FIG. 2 is a schematic diagram of implementing communication and interaction between a base station and the terminal device by using beams according to an embodiment of the present invention. That is, at least one beam in a beam set may be used to perform signaling/data interaction between the terminal device and the base station. FIG. 2 shows that beams 5, 6, and 7 and beams 14, 15, and 16 are used to perform signaling/data interaction between the terminal device and the base station. A beam resource in the present invention is visible or invisible to UE. For example, the UE can distinguish among different signals for identifying beams but cannot distinguish among different beams.

The terminal device first receives configuration information sent by the base station, where the configuration information includes an uplink power control parameter; estimates, according to the uplink power control parameter, a transmit power that is on an uplink shared channel and that is of a beam set in which the terminal device is located, where the beam set includes n beams, and n is a positive integer greater than or equal to 1; and determines, whether the terminal device sends the uplink shared channel and a physical uplink control channel to the base station at the same time. When the terminal device does not send the uplink shared channel and the physical uplink control channel at the same time, the terminal device may calculate, according to a maximum transmit power of the terminal device and the transmit power that is on the uplink shared channel and that corresponds to the beam set in which the terminal device is located, a power headroom of the beam set in which the terminal device is located. If it is determined that the terminal device sends the uplink shared channel and the physical uplink control channel to the base station at the same time, a power headroom of the beam set in which the terminal device is located needs to be calculated according to the maximum transmit power of the terminal device, the transmit power that is on the uplink shared channel and that corresponds to the beam set in which the terminal device is located, and a transmit power that is on the physical uplink control channel and that corresponds to the beam set in which the terminal device is located. Therefore, before the power headroom is calculated, the method further includes: calculating the transmit power that is on the physical uplink control channel and that corresponds to the beam set in which the terminal device is located. Eventually, the terminal device reports a power headroom report that has been calculated to the base station, so that the base station adjusts the transmit power on a terminal device side according to the power headroom report. Specifically, a method for estimating the transmit power on the uplink shared channel, a method for estimating the transmit power on the physical uplink control channel, and a method for determining an eventual power headroom report are described in detail in Embodiment 1 below.

Figure 3:
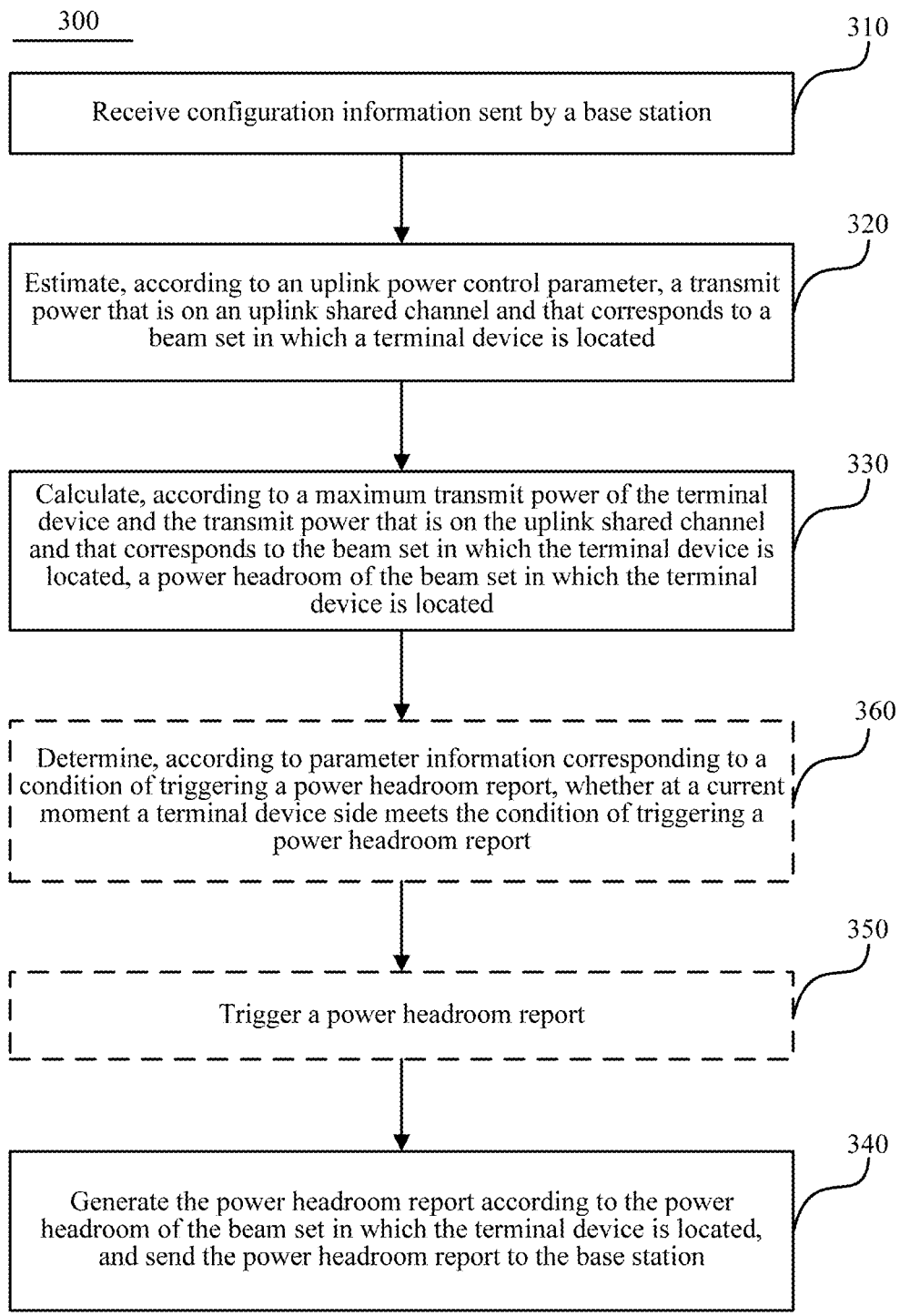
FIG. 3 is a schematic flowchart of a power control method according to Embodiment 1 of the present invention.

FIG. 3 is a schematic flowchart 300 of a power control method according to Embodiment 1 of the present invention. Specifically, as shown in FIG. 3, the method includes the following steps.

Step 310: Receive configuration information sent by a base station.

Specifically, the configuration information sent by the base station may include an uplink power control parameter. The uplink power control parameter may mainly include information such as a transmit power on a nominal physical uplink control channel, for example, a reference transmit power (for example, p0-Nominal PUCCH) of a PUCCH, an e-PUCCH, and a g-PUCCH; a transmit power on a UE-specific physical uplink control channel, for example, a reference transmit power (p0-UE-PUCCH) of a PUCCH, an e-PUCCH, and a g-PUCCH, and a reference transmit power (for example, p0-Nominal PUSCH) of a nominal uplink physical data (or shared) channel, for example, a physical uplink shared channel (Physical Uplink Shared Channel, PUSCH for short), an e-PUSCH, and a g-PUSCH; a transmit power on a UE-specific uplink physical data (or shared)

channel, for example, a reference transmit power (for example, p0-UE-PUSCH) of a PUSCH, an e-PUSCH, and a g-PUSCH; and a downlink path loss compensation factor (alpha). The reference transmit power here means a level that is expected by the base station and that is of a received power on a terminal device side. A manner of configuring the uplink power control parameter may include at least one of the following: using each beam in a beam set as a granularity, using each group of beams of k groups of beams as a granularity, using a carrier as a granularity, using a serving cell as a granularity, or using a terminal device as a granularity.

Step 320: Estimate, according to the uplink power control parameter, a transmit power that is on an uplink shared channel and that corresponds to a beam set in which the terminal device is located.

The beam set in the present invention is the beam set in which the terminal device is located. That is, a beam that can be used by a terminal to send or receive data/signals may be a serving beam of the terminal or a beam that can reach a geographical location. A beam is formed by using a beam-forming technology of a multiple-antenna technology. Specifically, as shown in FIG. 1, one beam set includes at least one beam. The beam has a relatively small beam width, usually less than 120 degrees.

Specifically, the transmit power that is on the uplink shared channel and that corresponds to the beam set in which the terminal device is located is estimated according to the configuration information. The transmit power that is on the uplink shared channel and that corresponds to the beam set in which the terminal device is located may be represented in two forms, which are specifically:

estimating, according to the uplink power control parameter, a transmit power that is on the uplink shared channel and that is of each beam in the beam set and collecting statistics; or estimating, according to the uplink power control parameter, a transmit power that is on the uplink shared channel and that is of the k groups of beams in the beam set in which the terminal device is located and collecting statistics. The k groups of beams form the beam set, and k is a positive integer greater than or equal to 1.

The transmit power of the uplink shared channel on each beam may be separately calculated by using a formula 3-1 and a formula 3-2. However, before this, the method further includes: determining whether the terminal device side sends the uplink shared channel and the physical uplink control channel to the base station at the same time.

If it is determined that the terminal device side does not send the uplink shared channel and the physical uplink control channel to the base station at the same time, it is determined to use the formula 3-1 to calculate the transmit power that is on the uplink shared channel and that is of each beam in the beam set.

A specific formula is, for example, shown in the formula (3-1):

$$P_{PUSCH,c}(i)_{\_beam\_p} = \min\left\{ \begin{array}{l} P_{CMAX,c\_beam\_p}(i) \\ 10\log_{10}(M_{PUSCH,c}(i))_{\_beam\_p} + P_{o\_PUSCH,c}(j)_{\_beam\_p} + \\ \alpha_c(j) \cdot PL_{c\_beam\_p} + \Delta_{TF,c}(i)_{\_beam\_p} + f_c(i)_{\_beam\_p} \end{array} \right\} \quad (3\text{-}1)$$

where $P_{PUSCH,c}(i)_{\_beam\_p}$ is a transmit power that is on the uplink shared channel and that corresponds to a $p^{th}$ beam that provides a service to the terminal device, $P_{CMAX,c\_beam\_p}(i)$ is a maximum transmit power of a subframe i corresponding to the $p^{th}$ beam that provides a service to the terminal device, $10\log_{10}(M_{PUSCH,c}(i)_{\_beam\_p}$ is a quantity of resource blocks allocated by the base station to the terminal device in the subframe i corresponding to the $p^{th}$ beam that provides a service to the terminal device, $P_{o\_PUSCH,c}(j)_{\_beam\_p}$ is a level that is expected by the base station and that is of a received power of the $p^{th}$ beam that provides a service to the terminal device, where j=0 corresponds to semi-persistent scheduling, j=1 corresponds to dynamic scheduling, and j=2 corresponds to an authorization parameter value in a random access response, and $$P_{o_{PUSCH},c}(j)_{beam_p} = P_{o_{UE_{PUSCH}},c}(j)_{beam_p} + P_{o_{NOMINAL_{PUSCH}}},c(j)_{beam_p},$$

$P_{o\_NOMINAL\_PUSCH,c}(j)_{\_beam\_p}$ represents a level that is expected by the base station and that is of the transmit power that is on the uplink shared channel and that corresponds to the $p^{th}$ beam that provides a service to the terminal device during normal demodulation, $P_{O\_UE\_PUSCH,c}(j)_{\_beam\_p}$ is a power offset relative to $P_{O\_NOMINAL\_PUSCH,c}$ on the $p^{th}$ beam that provides a service to the terminal device, $PL_{c\_beam\_p}$ is a downlink path loss value that corresponds to the $p^{th}$ beam that provides a service to the terminal device, ac(j) is a path loss compensation factor, and has a value ranging from 0 to 1, $\Delta_{TF,c}(i)$ is a power offset value of a different modulation and coding scheme format relative to a reference modulation and coding scheme format, $f_c(i)_{\_beam\_p}$ is an adjustment amount of the transmit power that is on the uplink shared channel and that corresponds to the $p^{th}$ beam that provides a service to the terminal device, $\widehat{PP_{CMAX,c}}(i)_{\_beam\_p}$ is a linear value of $P_{CMAX,c}(i)_{\_beam\_p}$, and beam_p represents the $p^{th}$ beam in the beam set, where p is a positive integer greater than 1 and less than or equal to n.

The maximum transmit power of the terminal device is a nominal (nominal) maximum transmit power of the terminal device, that is, a transmit power whose allowed maximum power reduction (the allowed maximum power reduction, MPR for short) and additional maximum power reduction (Additional Maximum Power Reduction, A-MPR for short) each meet a preset condition (for example, equal to 0 db).

$f_c(i)_{\_beam\_p}$ may be obtained by using one or a combination of the following manners:

obtaining by using downlink physical control signaling, where the downlink physical control signaling carries beam information;

allocation by using a transmit power control index allocated by a radio resource control layer and/or a transmit power control-radio network temporary identifier and by using each beam in the beam set or each group of beams of the k groups of beams as a granularity, where the transmit power control-radio network temporary identifier is used for decoding physical control signaling, and tpc-Index is used to indicate an index number of a TPC command of a user terminal: (–a TPC command number 1, a TPC command number 2, . . . , and a TPC command number N); and/or allocation by using a transmit power control index allocated by a Media Access Control layer and/or a transmit power control-radio network temporary identifier and by using each beam in the beam set or each group of beams of the k groups of beams as a granularity, where a terminal performs obtaining from a downlink physical control signaling TPC command by using such information; or binding by using a transmit power control index allocated by a radio resource control layer, and/or binding by using a transmit power control-radio network temporary identifier, and/or binding by using a beam resource, and/or binding by using each group of beams of the k groups of beams. Here, the binding is that at the RRC layer or the MAC layer, signaling is used to indicate a mapping relationship between a TPC index and/or a TPC-RNTI and a beam resource or each group of beams of the k groups of beams.

If it is determined that the terminal device sends the uplink shared channel and the physical uplink control channel to the base station at the same time, it is determined to use the formula (3-2) to calculate the transmit power on the uplink shared channel, specifically, as shown in the formula (3-2):

$$P_{PUSCH,c}(i)_{\_beam\_p} = \min \qquad (3\text{-}2)$$

$$\left\{ \begin{array}{l} 10\log_{10}\widehat{P_{CMAX,c}}(i)_{\_beam\_p} - \widehat{P_{PUCCH,c}}(i)_{\_beam\_p} \\ 10\log_{10}(M_{PUSCH,c}(i))_{\_beam\_p} + P_{o\_PUSCH,c}(j)_{\_beam\_p} + \alpha_c(j) \cdot \\ PL_{c\_beam\_p} + \Delta_{TF,c}(i) + f_c(i)_{\_beam\_p} \end{array} \right\}$$

where $P_{PUSCH,c}(i)_{\_beam\_p}$ is a transmit power that is on the uplink shared channel and that is of a subframe i corresponding to a $p^{th}$ beam that provides a service to the terminal device, $P_{CMAX,c}(i)_{\_beam\_p}$ is a maximum transmit power of the subframe i corresponding to the $p^{th}$ beam that provides a service to the terminal device, $P_{PUCCH,c}(i)_{\_beam\_p}$ is a transmit power that is on the physical uplink control channel and that is of the subframe i corresponding to the $p^{th}$ beam that provides a service to the terminal device, $10\log_{10}(M_{PUSCH,c}(i))_{\_beam\_p}$ is a quantity of resource blocks allocated by the base station to the terminal device in the subframe i corresponding to the $p^{th}$ beam that provides a service to the terminal device, $P_{O\_PUSCH,c}(j)_{\_beam\_p}$ is a level that is expected by the base station and that is of a received power of the $p^{th}$ beam that provides a service to the terminal device, where j=0 corresponds to semi-persistent scheduling, j=1 corresponds to dynamic scheduling, and j=2 corresponds to an authorization parameter value in a random access response, and $$P_{o\_PUSCH,c}(j)_{\_beam\_p} =$$
$$P_{o\_UE\_PUSCH,c}(j)_{\_beam\_p} + P_{o\_NOMINAL\_PUSCH,c}(j)_{\_beam\_p},$$
$$P_{o\_NOMINAL\_PUSCH,c}(j)_{\_beam\_p}$$

represents a level that is expected by the base station and that is of the transmit power that is on the uplink shared channel and that corresponds to the $p^{th}$ beam that provides a service to the terminal device during normal demodulation, $P_{O\_UE\_PUSCH,c}(j)_{\_beam\_p}$ is a power offset relative to $P_{O\_NOMINAL\_PUSCH,c}$ on the $p^{th}$ beam that provides a service to the terminal device, $PL_{c\_beam\_p}$ is a downlink path loss value that corresponds to the $p^{th}$ beam that provides a service to the terminal device, ac(j) is a path loss compensation factor, and has a value ranging from 0 to 1, $\Delta_{TF,c}(i)$ is a power offset value of a different modulation and coding scheme format relative to a reference modulation and coding scheme format, $f_c(i)_{\_beam\_p}$ is an adjustment amount of the transmit power that is on the uplink shared channel and that corresponds to the $p^{th}$ beam that provides a service to the terminal device, $\widehat{PP_{CMAX,c}}(i)_{\_beam\_p}$ is a linear value of $P_{CMAX,c}(i)_{\_beam\_p}$ $\widehat{PP_{PUCCH,c}}(i)_{\_beam\_p}$ is a linear value of $P_{PUCCH,c}(i)_{\_beam\_p}$, and beam_p represents the $p^{th}$ beam in the beam set, where p is a positive integer greater than 1 and less than or equal to k.

Certainly, readers should understand that the foregoing formula for calculating the transmit power on the uplink shared channel only represents a formula for calculating the transmit power on the uplink shared channel when data is sent in an $i^{th}$ subframe on each beam in the beam set.

In another case, the estimating the transmit power that is on the uplink shared channel and that corresponds to the beam set in which the terminal device is located is represented in another form: estimating, according to the uplink power control parameter, the transmit power that is on the uplink shared channel and that is of the k groups of beams in the beam set in which the terminal device is located. The k groups of beams form the beam set, and k is a positive integer greater than or equal to 1.

If it is determined that the terminal device does not send the uplink shared channel and the physical uplink control channel to the base station at the same time, it is determined to use a formula 3-3 to calculate the transmit power on the uplink shared channel.

Specifically, as shown in the following formula, $$P_{PUSCH,c}(i)_{\_beamq} = \qquad (3\text{-}3)$$

$$\min \left\{ \begin{array}{l} P_{CMAX,c\_beamq}(i) \\ 10\log_{10}(M_{PUSCH,c}(i))_{\_beamq} + P_{o\_PUSCH,c}(j)_{\_beamq} + \alpha_c(j) \cdot \\ PL_{c\_beamq} + \Delta_{TF,c}(i)_{\_beamq} + f_c(i)_{\_beamq} \end{array} \right\}$$

where $P_{PUSCH,c}(i)_{\_beamq}$ is a transmit power that is on the uplink shared channel and that corresponds to a $q^{th}$ group of beams that provide a service to the terminal device, $P_{CMAX,c}(i)_{\_beamq}$ is a maximum transmit power of a subframe i corresponding to the $q^{th}$ group of beams that provide a service to the terminal device, $10\log_{10}(M_{PUSCH,c}(i))_{\_beamq}$ is a quantity of resource blocks allocated by the base station to the terminal device in the subframe i corresponding to the $q^{th}$ group of beams that provide a service to the terminal device, $P_{O\_PUSCH,c}(j)_{\_beamq}$ is a level that is expected by the base station and that is of a received power of the $q^{th}$ group of beams that provide a service to the terminal device, where j=0 corresponds to semi-persistent scheduling, j=1 corresponds to dynamic scheduling, and j=2 corresponds to an authorization parameter value in a random access response, and $$P_{o\_PUSCH,c}(j)_{\_beamq} =$$
$$P_{o\_UE\_PUSCH,c}(j)_{\_beamq} + P_{o\_NOMINAL\_PUSCH,c}(j)_{\_beamq},$$
$$P_{o\_NOMINAL\_PUSCH,c}(j)_{\_beamq}$$

represents a level that is expected by the base station and that is of the transmit power that is on the uplink shared channel and that corresponds to the $q^{th}$ group of beams that provide a service to the terminal device during normal demodulation, $P_{O\_UE\_PUSCH,c}(j)_{\_beamq}$ is a power offset relative to $P_{O\_NOMINAL\_PUSCH,c}$ on the $q^{th}$ group of beams that provide a service to the terminal device, $PL_{c\_beamq}$ is a downlink path loss value corresponding to the $q^{th}$ group of beams that provide a service to the terminal device, $\alpha_c(j)$ is a path loss compensation factor, and has a value ranging from 0 to 1, $\Delta_{TF,c}(i)$ is a power offset value of a different modulation and coding scheme format relative to a reference modulation and coding scheme format, $f_c(i)\_{beamq}$ is an adjustment amount of the transmit power that is on the uplink shared channel and that corresponds to the $q^{th}$ group of beams that provide a service to the terminal device, $\widehat{PP_{CMAX,c}}(i)\_beamq$ is a linear value of $P_{CMAX,c}(i)\_{beamq}$, and beamq represents the $q^{th}$ group of beams in the beam set, where q is a positive integer greater than 1 and less than or equal to n.

The maximum transmit power of the terminal device is a nominal (nominal) maximum transmit power of the terminal device, that is, a transmit power whose allowed maximum power reduction (the allowed maximum power reduction, MPR for short) and additional maximum power reduction (Additional Maximum Power Reduction, A-MPR for short) each meet a preset condition (for example, equal to 0 db).

$f_c(i)\_{beamq}$ may be obtained by using one or a combination of the following manners:

obtaining by using downlink physical control signaling, where the downlink physical control signaling carries beam information;

allocation by using a transmit power control index allocated by a radio resource control layer and/or a transmit power control-radio network temporary identifier and by using each beam in the beam set or each group of beams of the k groups of beams as a granularity, where the transmit power control-radio network temporary identifier is used for decoding physical control signaling, and tpc-Index is used to indicate an index number of a TPC command of a user terminal: (–a TPC command number 1, a TPC command number 2, . . . , and a TPC command number N); and/or allocation by using a transmit power control index allocated by a Media Access Control layer and/or a transmit power control-radio network temporary identifier and by using each beam in the beam set or each group of beams of the k groups of beams as a granularity, where a terminal performs obtaining from a downlink physical control signaling TPC command by using such information; or binding by using a transmit power control index allocated by a radio resource control layer, and/or binding by using a transmit power control-radio network temporary identifier, and/or binding by using a beam resource, and/or binding by using each group of beams of the k groups of beams. Here, the binding is that at the RRC layer or the MAC layer, signaling is used to indicate a mapping relationship between a TPC index and/or a TPC-RNTI and a beam resource or each group of beams of the k groups of beams.

If it is determined that the terminal device side sends the uplink shared channel and the physical uplink control channel to the base station at the same time, it is determined to use a formula 3-4 to calculate the transmit power on the uplink shared channel.

Specifically, as shown in the following formula:

$$P_{PUSCH,c}(i)\_{beamq} = \min\left\{ \begin{array}{c} 10\log_{10}\widehat{P_{CMAX,c}}(i)\_{beamq} - \widehat{P_{PUCCH,c}}(i)\_{beamq} \\ 10\log_{10}(M_{PUSCH,c}(i))\_{beamq} + P_{o\_PUSCH,c}(j)\_{beamq} + \alpha_c(j) \cdot \\ PL_{c\_beamq} + \Delta_{TF,c}(i) + f_c(i)\_{beamq} \end{array} \right\} \quad (3\text{-}4)$$

where $P_{PUSCH,c}(i)$ beamq is a transmit power that is on the uplink shared channel and that corresponds to a $q^{th}$ group of beams that provide a service to the terminal device, $P_{CMAX,c}(i)\_{beamq}$ is a maximum transmit power of a subframe i corresponding to the $q^{th}$ group of beams that provide a service to the terminal device, $P_{PUCCH,c}(i)$ beamq is a transmit power that is on the physical uplink control channel and that is of the subframe i corresponding to the $q^{th}$ group of beams that provide a service to the terminal device, $P_{PUCCH,c}(i)$ beamq is a transmit power that is on the physical uplink control channel and that corresponds to the $q^{th}$ group of beams that provide a service to the terminal device, $10 \log_{10} (M_{PUSCH,c}(i))\_{beamq}$ is a quantity of resource blocks allocated by the base station to the terminal device in the subframe i corresponding to the $q^{th}$ group of beams that provide a service to the terminal device, $P_{O\_PUSCH,c}(j)\_{beamq}$ is a level that is expected by the base station and that is of a received power of the $q^{th}$ group of beams that provide a service to the terminal device, where j=0 corresponds to semi-persistent scheduling, j=1 corresponds to dynamic scheduling, and j=2 corresponds to an authorization parameter value in a random access response, and $$P_{o\_PUSCH,c}(j)\_{beamq} = P_{o\_UE\_PUSCH,c}(j)\_{beamq} + P_{o\_NOMINAL\_PUSCH,c}(j)\_{beamq},$$

$$P_{o\_NOMINAL\_PUSCH,c}(j)\_{beamq}$$

represents a level that is expected by the base station and that is of the transmit power that is on the uplink shared channel and that corresponds to the $q^{th}$ group of beams that provide a service to the terminal device during normal demodulation, $P_{O\_UE\_PUSCH,c}(j)\_{beamq}$ is a power offset relative to $P_{O\_NOMINAL\_PUSCH,c}$ on the $q^{th}$ group of beams that provide a service to the terminal device, $PL_{c\_beamq}$ is a downlink path loss value corresponding to the $q^{th}$ group of beams that provide a service to the terminal device, $\alpha_c(j)$ is a path loss compensation factor, and has a value ranging from 0 to 1, $\Delta_{TF,c}(i)$ is a power offset value of a different modulation and coding scheme format relative to a reference modulation and coding scheme format, $f_c(i)\_{beamq}$ is an adjustment amount of the transmit power that is on the uplink shared channel and that corresponds to the $q^{th}$ group of beams that provide a service to the terminal device, $\widehat{PP_{CMAX,c}}(i)\_beamq$ is a linear value of $P_{CMAX,c}(i)$ _beamq $\widehat{PP_{PUCCH,c}}(i)\_{beamq}$ is a linear value of $P_{PUCCH,c}(i)\_{beamq}$, and beamq represents the $q^{th}$ group of beams in the beam set, where q is a positive integer greater than 1 and less than or equal to k.

The maximum transmit power of the terminal device is a nominal (nominal) maximum transmit power of the terminal device, that is, a transmit power whose allowed maximum power reduction (the allowed maximum power reduction, MPR for short) and additional maximum power reduction (Additional Maximum Power Reduction, A-MPR for short) each meet a preset condition (for example, equal to 0 db).

$f_c(i)\_{beamq}$ may be obtained by using one or a combination of the following manners: obtaining by using downlink physical control signaling, where the downlink physical control signaling carries beam information;

allocation by using a transmit power control index allocated by a radio resource control layer and/or a transmit power control-radio network temporary identifier and by using binding of each beam in the beam set or each group of beams of the k groups of beams as a granularity, where the transmit power control-radio network temporary identifier is used for decoding physical control signaling, and tpc-Index is used to indicate an index number of a TPC command of a user terminal: (–a TPC command number 1, a TPC command number 2, . . . , and a TPC command number N); and/or allocation by using a transmit power control index allocated by a Media Access Control layer and/or a transmit power control-radio network temporary identifier and by using binding of each beam in the beam set or each group of beams of the k groups of beams as a granularity, where a terminal performs obtaining from a downlink physical control signaling TPC command by using such information; or binding by using a transmit power control index allocated by a radio resource control layer, and/or binding by using a transmit power control-radio network temporary identifier, and/or binding by using a beam resource, and/or binding by using each group of beams of the k groups of beams. Here, the binding is that at the RRC layer or the MAC layer, signaling is used to indicate a binding mapping relationship between a TPC index and/or a TPC-RNTI and a beam resource or each group of beams of the k groups of beams.

After the estimating, according to the uplink power control parameter, a transmit power that is on an uplink shared channel and that corresponds to a beam set in which the terminal device is located, the method further includes: estimating, according to the uplink power control parameter, a transmit power that is on the physical uplink control channel and that corresponds to the beam set in which the terminal device is located. Similar to the estimating the transmit power that is on the uplink shared channel and that corresponds to the beam set in which the terminal device is located, the transmit power that is on the physical uplink control channel and that corresponds to the beam set in which the terminal device is located is similarly represented in two forms. In one form, the transmit power that is on the physical uplink control channel and that corresponds to each beam in the beam set is estimated according to the uplink power control parameter. In the other manner, the transmit power that is on the physical uplink control channel and that is of the k groups of beams in the beam set in which the terminal device is located is estimated according to the uplink power control parameter.

A formula for estimating, according to the uplink power control parameter, the transmit power that is on the physical uplink control channel and that corresponds to the $p^{th}$ beam in the beam set is shown in a formula (3-5):

$$P_{PUCCH}(i)_{\_beam\_p} = \min \begin{Bmatrix} P_{CMAX,c}(i)_{\_beam\_p} \\ p_{O\_PUCCH\_beam\_p} + PL_{c\_beam\_p} + h(n_{CQI}, n_{HARQ}, n_{SR})_{\_beam\_p} + \\ \Delta_{F_{PUCCH}}(F)_{\_beam\_p} + \Delta_{TxD}(F')_{\_beam\_p} + g(i)_{\_beam\_p} \end{Bmatrix} \quad (3\text{-}5)$$

where $P_{CMAX,c}(i)_{\_beam\_p}$ is a maximum transmit power of a subframe i corresponding to the $p^{th}$ beam that provides a service to the terminal device, $PL_{c\_beam\_p}$ is a downlink path loss value that corresponds to the $p^{th}$ beam that provides a service to the terminal device; $p_{O\_PUCCH\_beam\_p}$ is a power reference value that is set by using radio resource control layer signaling and that corresponds to the $p^{th}$ beam that provides a service to the terminal device; $h(n_{CQI}, n_{HARQ}, n_{SR})_{\_beam\_p}$ is a transmit power offset that is of the physical uplink control channel and that is set, according to a carried channel quality indicator and a quantity of acknowledgment bits, on the $p^{th}$ beam that provides a service to the terminal device; $\Delta_{F_{PUCCH}}(F)_{\_beam\_p}$ is a power offset of a physical uplink control channel format F relative to a PUCCH format 1a, $\Delta_{TxD}(F')_{\_beam\_p}$ is a power offset that is determined according to a modulation and coding scheme and a data type and that corresponds to the $p^{th}$ beam that provides a service to the terminal device, $g(i)_{\_beam\_p}$ is an adjustment value of closed-loop power control that is of a terminal and that corresponds to the $p^{th}$ beam that provides a service to the terminal device, and beam_p represents the $p^{th}$ beam that provides a service to the terminal device, where p is less than or equal to a total quantity of beams in the beam set.

$g(i)_{\_beam\_k}$ may be obtained in at least one of the following manners:

obtaining by using downlink physical control signaling, where the downlink physical control signaling carries beam information;

allocation by using a transmit power control index allocated by a radio resource control layer and/or a transmit power control-radio network temporary identifier and by using binding of each beam in the beam set or each group of beams of the k groups of beams as a granularity, where the transmit power control-radio network temporary identifier is used for decoding physical control signaling, and tpc-Index is used to indicate an index number of a TPC command of a user terminal: (–a TPC command number 1, a TPC command number 2, . . . , and a TPC command number N); and/or allocation by using a transmit power control index allocated by a Media Access Control layer and/or a transmit power control-radio network temporary identifier and by using binding of each beam in the beam set or each group of beams of the k groups of beams as a granularity, where a terminal performs obtaining from a downlink physical control signaling TPC command by using such information; or binding by using a transmit power control index allocated by a radio resource control layer, and/or binding by using a transmit power control-radio network temporary identifier, and/or binding by using a beam resource, and/or binding by using each group of beams of the k groups of beams bind. Here, the binding is that at the radio resource control layer or the Media Access Control layer, signaling is used to indicate a binding mapping relationship between a TPC index and/or a TPC-RNTI and a beam resource or each group of beams of the k groups of beams.

In another case, a formula for estimating, according to the uplink power control parameter, a transmit power that is on the physical uplink control channel and that is of each group of beams of the k groups of beams in which the terminal device is located is shown in a formula 3-6:

$$P_{PUCCH}(i)_{\_beamq} = \qquad (3\text{-}6)$$
$$\min \begin{Bmatrix} P_{CMAX,c}(i)_{\_beamq} \\ p_{O\_PUCCH\_beamq} + PL_{c\_beamq} + h(n_{CQI}, n_{HARQ}, n_{SR})_{\_beamq} + \\ \Delta_{F_{PUCCH}}(F)_{\_beamq} + \Delta_{TxD}(F')_{\_beamq} + g(i)_{\_beamq} \end{Bmatrix}$$

where $P_{CMAX,c}(i)_{\_beamq}$ is a maximum transmit power of a subframe i corresponding to a $q^{th}$ group of beams that provide a service to the terminal device, $PL_{c\_beamq}$ is a downlink path loss value corresponding to the $q^{th}$ group of beams that provide a service to the terminal device, $p_{O\_PUCCH\_beamq}$ is a power reference value that is set by using radio resource control layer signaling and that corresponds to the $q^{th}$ group of beams that provide a service to the terminal device, $h(n_{CQI}, n_{HARQ}, n_{SR})_{\_beamq}$ is a transmit power offset that is of the physical uplink control channel and that is set, according to a carried channel quality indicator and a quantity of acknowledgment bits, on the $q^{th}$ group of beams that provide a service to the terminal device, $\Delta_{F_{PUCCH}}(F)_{\_beamq}$ is a power offset of a physical uplink control channel format F relative to a PUCCH format 1a, $\Delta_{TxD}(F')$ beamq is a power offset that is determined according to a modulation and coding scheme and a data type and that corresponds to the $q^{th}$ group of beams that provide a service to the terminal device, g (i) $_{\_beamq}$ is an adjustment value of closed-loop power control that is of a terminal and that corresponds to the $q^{th}$ group of beams that provide a service to the terminal device, and beamq represents the $q^{th}$ group of beams that provide a service to the terminal device, where q is less than or equal to k.

Certainly, the formula 3-3 is actually used to calculate the transmit power that is on the uplink shared channel and that corresponds to the $p^{th}$ beam in the beam set in the $i^{th}$ subframe, and the formula 3-5 is actually used to calculate the transmit power that is on the physical uplink control channel and that corresponds to the $p^{th}$ beam in the beam set in the $i^{th}$ subframe. In an actual calculation process, the transmit power on the uplink shared channel and the transmit power on the physical uplink control channel that exist when data is sent in different subframes on each beam in the beam set need to be calculated according to a formula that is the same as or similar to the formula 3-3 or 3-5, and statistics is collected.

Similarly, the formula 3-4 is actually used to calculate the transmit power that is on the uplink shared channel and that corresponds to the $q^{th}$ group of beams of the k groups of beams of the beam set in the subframe i, and the formula 3-6 is actually used to calculate the transmit power that is on the physical uplink control channel and that corresponds to the $q^{th}$ group of beams of the k groups of beams of the beam set in the subframe i. In an actual process, the transmit power on the uplink shared channel and the transmit power on the physical uplink control channel that exist when data is sent in different subframes on each group of beams of the k groups of beams need to be calculated according to a formula that is the same as or similar to the formula 3-4 or the formula 3-6, and statistics is collected.

Step 330: Calculate, according to a maximum transmit power of the terminal device and the transmit power that is on the uplink shared channel and that corresponds to the beam set in which the terminal device is located, a power headroom of the beam set in which the terminal device is located.

The maximum transmit power (The configured maximum UE output power, PCMAX for short) of the terminal device in all the formulas described in the present invention is a value configured by the base station. The included PCMAX, c_beam_p mentioned in the formulas means a maximum transmit power of the terminal on the $p^{th}$ beam in the beam set, or the included PCMAX,c_beamq mentioned in the formulas means a maximum transmit power of the terminal on the $q^{th}$ group of beams in the beam set. Similar to the calculating the transmit power on the uplink shared channel and the transmit power on the physical uplink control channel, the power headroom may similarly be calculated in two manners according to the maximum transmit power of the terminal device and the transmit power that is on the physical uplink control channel and that corresponds to the beam set in which the terminal device is located. A precondition for using first calculation manner is: It is determined that the terminal device does not send the uplink shared channel and the physical uplink control channel to the base station at the same time. A precondition for using a second calculation manner is: It is determined that the terminal device sends the uplink shared channel and the physical uplink control channel to the base station at the same time. In addition, during calculation of the power headroom, for each calculation manner in the foregoing, two detailed calculation manners are further included. For example, when it is determined that the terminal device does not send the uplink shared channel and the physical uplink control channel to the base station at the same time, the terminal device calculates the power headroom of the beam set in which the terminal device is located according to the maximum transmit power of the terminal device and the transmit power that is on the uplink shared channel and that corresponds to the beam set in which the terminal device is located.

Correspondingly, detailed manners include: first, sequentially calculating, according to the maximum transmit power of the terminal device and a transmit power that is on the uplink shared channel and that is of a $p^{th}$ beam in the beam set, a power headroom of the $p^{th}$ beam in the beam set, until power headrooms of all beams in the beam set have been calculated, where p is a positive integer greater than or equal to 1 and less than or equal to n; or second, sequentially calculating a power headroom of the $q^{th}$ group of beams of the k groups of beams according to the maximum transmit power of the terminal device and a transmit power that is on the uplink shared channel and that is of a $q^{th}$ group of beams of the k groups of beams, until power headrooms of all groups of beams of the k groups of beams have been calculated, where q is a positive integer greater than or equal to 1 and less than or equal to k. Same as the foregoing description, the k groups of beams form the entire beam set.

The foregoing two formulas for calculating the power headroom are shown in formulas 3-7 and 3-8.

$$PH_{type1\_1,c}(i)_{\_beam\_p} = p_{CMAX,c}(i)_{\_beam\_p} - \left\{ \begin{array}{l} 10\log_{10}(M_{PUSCH,c}(i)_{\_beam\_p} + P_{O\_PUSCH,c}(j)_{\_beam\_p} + \\ \alpha_c(j) \cdot PL_{c\_beam\_p} + \Delta_{TF,c}(i)_{\_beam\_k} + f_c(i)_{\_beam\_p}) \end{array} \right\} \quad (3\text{-}7)$$

where for the parameters in this formula, refer to the definitions of the parameters in the calculation formulas for estimating the transmit power that is on the uplink shared channel and that is of the $p^{th}$ beam in the beam set and for estimating the transmit power that is on the physical uplink control channel and that is of the $p^{th}$ beam in the beam set. Details are not described herein again.

$$PH_{type1\_2,c}(i)_{\_beamq} = p_{CMAX,c}(i)_{\_beamq} - \left\{ \begin{array}{l} 10\log_{10}(M_{PUSCH,c}(i)_{\_beamq} + P_{O\_PUSCH,c}(j)_{\_beamq} + \\ \alpha_c(j) \cdot PL_{c\_beamq} + \Delta_{TF,c}(i)_{\_beamq} + f_c(i)_{\_beamq}) \end{array} \right\} \quad (3\text{-}8)$$

where for the parameters in this formula, refer to the definitions of the parameters in the calculation formulas for estimating the transmit power that is on the uplink shared channel and that is of the $q^{th}$ group of beams of the k groups of beams and for estimating the transmit power that is on the physical uplink control channel and that is of the $q^{th}$ group of beams of the k groups of beams. Details are not described herein again.

When it is determined that the terminal device sends the uplink shared channel and the physical uplink control channel to the base station at the same time, the terminal device calculates, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, a power headroom of the beam set in which the terminal device is located.

Correspondingly, detailed manners include: first, sequentially calculating, according to the maximum transmit power of the terminal device, a transmit power that is on the uplink shared channel and that is of a $p^{th}$ beam in the beam set, and a transmit power that is on the physical uplink control channel and that is of the $p^{th}$ beam in the beam set, a power headroom of the $p^{th}$ beam in the beam set, until power headrooms of all beams in the beam set have been calculated, where p is a positive integer greater than or equal to 1 and less than or equal to n; or second, sequentially calculating, according to the maximum transmit power of the terminal device, a transmit power that is on the uplink shared channel and that is of a $q^{th}$ group of beams of the k groups of beams, and a transmit power that is on the physical uplink control channel and that is of the $q^{th}$ group of beams of the k groups of beams, a power headroom of the $q^{th}$ group of beams of the k groups of beams, until power headrooms of all groups of beams of the k groups of beams have been calculated, where q is a positive integer greater than or equal to 1 and less than or equal to k. Same as the foregoing description, the k groups of beams form the entire beam set.

The foregoing two formulas for calculating the power headroom are shown in formulas 3-9 and 3-10.

$$PH_{type2\_1}(i)_{beam\_p} = \qquad (3-9)$$

$$P_{CMAX,c}(i)_{beam\_p} - 10\log_{10}\left(10^{\frac{(M_{PUSCH,c}(i)_{beam\_p} + P_{O\_PUSCH,c}(j)_{beam\_p} + \alpha_c(j) \cdot PL_{c\_beam\_p} + \Delta_{TF,c}(i)_{beam\_p} + f_c(i)_{-beam\_p})}{10}} + 10^{\frac{(P_{O\_PUCCH,c}(j)_{beam\_p} + PL_{c\_beam\_p} + h(n_{CQI}, n_{HARQ}, n_{SR})_{beam\_p} + \Delta F_{PUCCH}(F)_{beam\_p} + \Delta_{TxD}(F')_{beam\_p} + g(i)_{-beam\_p})}{10}}\right)$$

where for the parameters in this formula, refer to the definitions of the parameters in the calculation formulas for estimating the transmit power that is on the uplink shared channel and that is of the $p^{th}$ beam in the beam set and for estimating the transmit power that is on the physical uplink control channel and that is of the $p^{th}$ beam in the beam set. Details are not described herein again.

$$PH_{type2\_2}(i)_{beamq} = P_{CMAX,c}(i)_{beamq} - \qquad (3-10)$$

$$10\log_{10}\left(10^{\frac{(M_{PUSCH,c}(i)_{beamq} + P_{O\_PUSCH,c}(j)_{beamq} + \alpha_c(j) \cdot PL_{c\_beamq} + \Delta_{TF,c}(i)_{beamq} + f_c(i)_{beamq})}{10}} + 10^{\frac{(P_{O\_PUCCH,c}(j)_{beamq} + PL_{c\_beamq} + h(n_{CQI}, n_{HARQ}, n_{SR})_{beamq} + \Delta F_{PUCCH}(F)_{beamq} + \Delta_{TxD}(F')_{beamq} + g(i)_{beamq})}{10}}\right)$$

where for the parameters in this formula, refer to the definitions of the parameters in the calculation formulas for estimating the transmit power that is on the uplink shared channel and that is of the $q^{th}$ group of beams of the k groups of beams and for estimating the transmit power that is on the physical uplink control channel and that is of the $q^{th}$ group of beams of the k groups of beams. Details are not described herein again.

Readers should further understand that, in all the foregoing formulas 3-2, 3-4, 3-6, 3-8, and 3-10, each group of beams of the k groups of beams is used as a "unit", so as to estimate the transmit power that is on the uplink shared channel and that is of each group of beams, the transmit power that is on the physical uplink control channel and that is of each group of beams, the corresponding power headroom, and the like. Here, one group of beams is used as one entire resource block. Then the transmit power that is on the uplink shared channel and that is of the entire group of beams, the transmit power that is on the physical uplink control channel and that is of the entire group of beams, and the corresponding power headroom are estimated.

Step 340: Generate a power headroom report according to the power headroom of the beam set in which the terminal device is located, and send the power headroom report to the base station.

Specifically, when the power headroom report is generated, the power headroom report may include one or a combination of the following parameters that correspond to each group of beams of the k groups of beams or respectively correspond to each beam in the beam set: the power headroom, the transmit power on the physical uplink control channel, the transmit power on the uplink shared channel, or the like. Alternatively, a subcarrier number (for example, C1 to C3 shown in Table 2) and other information corresponding to the beam set may further be included. For details, refer to the content shown in Table 1 to Table 7.

In step 310, the configuration information may further include first control signaling. The first control signaling is used to instruct the terminal device to configure a type of a power headroom report. The configured type of the power headroom report includes at least one of the following: a power headroom report that is applied to a beam technology and that is based on a beam; a power headroom report that is applied to a beam technology and that is based on a beam group; a first extended power headroom report that is applied to carrier aggregation and that is based on a carrier and a beam; a second extended power headroom report that is applied to carrier aggregation and that is based on a carrier and a beam group; a first dual connectivity power headroom report that is applied to a dual connectivity scenario and that is based on a serving cell and a beam; a second dual connectivity power headroom report that is applied to a dual connectivity scenario and that is based on a serving cell and a beam group; a third extended power headroom report that is applied to massive carrier aggregation and that is based on a carrier and a beam; or a fourth extended power headroom report that is applied to massive carrier aggregation and that is based on a carrier and a beam group.

Before the generating the power headroom report, the terminal device configures the type of the power headroom report according to first control signaling sent by the base station. Moreover, after configuring the power headroom report, the terminal device further reports PHR MAC signaling to the base station by using a MAC layer, to inform the base station that the power headroom report has been configured.

Corresponding to the foregoing types of power headroom reports, for example:

In a first type, when the base station indicates that a type of a power headroom report to be configured by the terminal device is a PH, in this case, the terminal device sends the PHR to the base station in a form of a PH MAC CE.

In a second type, when the base station indicates that the type that is of the power headroom report and that is configured by the UE is an extended power headroom report extended PH, in this case, the terminal device sends the PHR in a form of an extended PH MAC CE.

In a third type, when the base station indicates that a type of a power headroom report to be configured by the terminal device is a dual connectivity PHR, that is, a dual connectivity PHR that is applied to a dual connectivity scenario and that is based on a serving cell, in this case, the terminal device sends the power headroom report in a form of a dual connectivity PHR MAC.

In a fourth type, when the base station indicates that the type that is of the power headroom report and that is configured by the UE is an extended PH2, that is, a power headroom report PHR that is applied to massive carrier aggregation (massive carrier aggregation), in this case, the terminal device sends the PHR in a form of an extended PH2 MAC CE.

In a fifth type, when the base station indicates that the type that is of the power headroom report and that is configured by the UE is a fifth-type PH-B, that is, a type of a power headroom report that is applied to a beam technology and that is based on a beam, in this case, the terminal device sends the PHR to the base station in a form of a PH-B MAC CE, as shown in Table 1.

In a sixth type, when the base station indicates that a type of a power headroom report to be configured by the terminal device is a sixth-type extended PH-B, that is, a first extended power headroom (extended PHR) report that is applied to carrier aggregation and that is based on a carrier and a beam, in this case, the terminal device sends the power headroom report in a form of an extended PH-B MAC CE, as shown in Table 2 or Table 3 or Table 4. Table 2 represents that one MAC PDU indicates power headroom reports of a beam on different carriers. When power headroom reports of multiple beams need to be sent, multiple MAC PDUs need to be sent. In Tables 3 and 4, one MAC PDU indicates power headroom reports of different beams on each carrier. A MAC PDU in Table 3 has carrier aggregation of only a pcell (primary cell primary carrier) application, and multiple beams exist on the carrier.

In a seventh type, when the base station indicates that a type of a power headroom report to be configured by the terminal device is a seventh-type dual connectivity PHR-B PH, that is, a dual connectivity PHR-B that is applied to a dual connectivity scenario and that is based on a serving cell and a beam, in this case, the terminal device sends the power headroom report in a form of a dual connectivity PHR-B MAC, as shown in Table 5.

In an eighth type, when the base station indicates that a type of a power headroom report to be configured by the terminal device is an extended PH2-B, that is, a power headroom report PHR that is applied to massive carrier aggregation and that is based on a carrier and a beam, in this case, the terminal device sends the PHR in a form of an extended PH2-B MAC CE, for example, as shown in Table 6 or Table 7. In Table 6, only a pcell has a PUCCH, and in Table 7, only a scell (secondary cell, secondary cell) may have a PUCCH.

Certainly, corresponding to the foregoing the sixth type, a second extended power headroom report that is applied to carrier aggregation and that is based on a carrier and a beam group may further be included. A table of the power headroom report sent by the terminal device to the base station is similar to Table 3 or Table 4. However, a power headroom of the table corresponds to a power headroom report of a group of beams. Alternatively, corresponding to the seventh type, a second dual connectivity power headroom report that is applied to a dual-link scenario and that is based on a serving cell and a beam group may further be included. A table of the power headroom report sent by the terminal device to the base station is similar to Table 5. Similarly, a power headroom of the table corresponds to power headroom reports of a group of beams. Alternatively, corresponding to the eighth type, a fourth extended power headroom report that is applied to massive carrier aggregation and that is based on a carrier and a beam group may further be included. A table of the power headroom report sent by the terminal device to the base station is similar to Table 6 or Table 7. However, a power headroom of the table corresponds to power headroom reports of a group of beams.

A PHR report may be specifically represented in a form shown in the following Tables 1 to 7:

In Table 1, B1 to B7 are labels (for example, B1 represents a beam 1, and B2 represents a beam 2) of beams in the beam set, R is a reserved bit, PH1 is a power headroom corresponding to a beam whose beam label is B1, PH2 is a power headroom corresponding to a beam whose beam label is B2, . . . , and PH7 is a power headroom corresponding to a beam whose beam label is B7.

Table 2 represents forms in which PHR reports in a case of carrier aggregation are represented. C1 to C7 represent region numbers of carriers, B0 to B7 similarly represent beam labels. When a value corresponding to $C_i$ of C1 to C7 is 1, a related parameter of a power headroom corresponding to $C_i$ in the table appears. i is greater than or equal to 1 and less than or equal to 7. P represents power backoff, and a value of P may be 1 or 0. When the value of P is 1, power backoff will be used in calculation of the power headroom. If the value of P is 0, power backoff will not be used in calculation of the power headroom. V is a form parameter, represents a virtual value, and is used to determine whether actual data is sent on a PUSCH. When the value of V is 1, it represents that no data is sent on the PUSCH. When the value of V is 0, it represents that one piece of actual data is sent. R similarly represents a reserved symbol. Pcmaxci represents that a power headroom is sent on an $i^{th}$ carrier. In Table 2, the type type2 is used only in the first table, that is, the first carrier carries a related parameter of a power headroom of a primary carrier. The second to $m^{th}$ carriers carry related parameters of power headrooms of a secondary carrier, and a type type1 is used to calculate the power headroom (because a secondary carrier does not have a PUCCH). Each physical carrier includes one beam set, and each beam set includes eight beams. Therefore, a PH (Type1, SCelln) represents that a power headroom is calculated by using a formula of type 1, and a mainly calculated PH is a power headroom of a secondary carrier n.

The meanings of the parameters in Table 3 are the same as or similar to those of the parameters in Table 2. Details are not described herein again. However, in Table 2, when a power headroom of a primary beam set is sent, beam k is added, and represents a specific beam in a primary beam set. That is, a power headroom of a specific beam in a beam set corresponding to the primary beam set is explicitly described in the table. That is, Table 3 describes specific power headrooms of all beams, transmit powers on PUSCHs, and transmit powers on PUCCHs, and the like.

Specifically, Tables 4 to 7 are as follows.

TABLE 6

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $B_7$ | $B_6$ | $B_5$ | $B_4$ | $B_3$ | $B_2$ | $B_1$ | R |
| P | V | | PH (Type 2, PCell, Beam k) | | | | |
| R | R | | $P_{CMAX,c}$ 1 | | | | |
| P | V | | PH (Type 1, PCell, Beam k) | | | | |
| R | R | | $P_{CMAX,c}$ 2 | | | | |
| $B_7$ | $B_6$ | $B_5$ | $B_4$ | $B_3$ | $B_2$ | $B_1$ | R |
| P | V | | PH (Type 1, SCell, beam k) | | | | |
| R | R | | $P_{CMAX,c}$ 3 | | | | |
| ... | | | | | | | |
| $B_7$ | $B_6$ | $B_5$ | $B_4$ | $B_3$ | $B_2$ | $B_1$ | R |
| P | V | | PH (Type 1, SCell n, beam k) | | | | |
| R | R | | $P_{CMAX,c}$ m | | | | |

TABLE 7

| $C_7$ | $C_6$ | $C_5$ | $C_4$ | $C_3$ | $C_2$ | $C_1$ | R |
|---|---|---|---|---|---|---|---|
| $C_{15}$ | $C_{14}$ | $C_{13}$ | $C_{12}$ | $C_{11}$ | $C_{10}$ | $C_9$ | $C_8$ |
| $C_{23}$ | $C_{22}$ | $C_{21}$ | $C_{20}$ | $C_{19}$ | $C_{18}$ | $C_{17}$ | $C_{16}$ |
| $C_{31}$ | $C_{30}$ | $C_{29}$ | $C_{28}$ | $C_{27}$ | $C_{26}$ | $C_{25}$ | $C_{24}$ |
| $B_7$ | $B_6$ | $B_5$ | $B_4$ | $B_3$ | $B_2$ | $B_1$ | R |
| P | V | | PH (Type 2, PCell, Beam k) | | | | |
| R | R | | $P_{CMAX,c}$ 1 | | | | |
| P | V | | PH (Type 1, PCell 1, Beam k) | | | | |
| R | R | | $P_{CMAX,c}$ 2 | | | | |
| $B_7$ | $B_6$ | $B_5$ | $B_4$ | $B_3$ | $B_2$ | $B_1$ | R |
| P | V | | PH (Type 2, PUCCH SCell, beam k) | | | | |
| R | R | | $P_{CMAX,c}$ 3 | | | | |

TABLE 7-continued

| $B_7$ | $B_6$ | $B_5$ | $B_4$ | $B_3$ | $B_2$ | $B_1$ | R |
|---|---|---|---|---|---|---|---|
| P | V | | PH (Type 1, SCell 1, beam k) | | | | |
| R | R | | $P_{CMAX,c}$ 4 | | | | |
| ... | | | | | | | |
| $B_7$ | $B_6$ | $B_5$ | $B_4$ | $B_3$ | $B_2$ | $B_1$ | R |
| P | V | | PH (Type 1, SCell n, beam k) | | | | |
| R | R | | $P_{CMAX,c}$ m | | | | |

The meanings of the parameters in Table 4 to Table 7 are similar to those of the parameters in Table 1 to Table 3. A difference is that the power headroom report is described in further detail in Table 4 to Table 7. The details are not described herein again.

However, before step 340, the method further includes:
step 350: Trigger the power headroom report.

In the configuration information described in step 310, the configuration information may further include parameter information corresponding to a condition of triggering a power headroom report.

A manner of configuring the uplink power control parameter may include at least one of the following: using each beam in the beam set as a granularity, using each group of beams of the k groups of beams as a granularity, using a carrier as a granularity; using a serving cell as a granularity, or using a terminal device as a granularity. Similarly, a manner of configuring the parameter information of the condition of triggering a power headroom report similarly includes at least one of the following: using each beam in the beam set as a granularity, using each group of beams of the k groups of beams as a granularity, using a carrier as a granularity, using a serving cell as a granularity, or using a terminal device as a granularity.

It should be noted that, in both configuration of the uplink power control parameter and configuration of the parameter information corresponding to the condition of triggering a power headroom report, if each beam in the beam set is used as a granularity, the configuration information needs to include a beam identifier or label, or an identifier or a label of a signal used for identifying a beam. A beam identifier or label is used to identify in which beam a configuration parameter is stored. An effect of an identifier or a label of a signal that identifies a beam is equivalent to that of identifying in which beam a configuration parameter is stored. The signal used for identifying a beam may include one or more of the following: a reference signal for the beam or a beam identifier. Certainly, a discovery signal for the beam may further include a reference signal for the beam. If each beam in the beam set is used as a granularity, it indicates that a set of configuration parameters is configured for each beam in the beam set, and includes the uplink power control parameter and the parameter information corresponding to the condition of triggering a power headroom report. If the terminal device is used as a granularity to configure the parameter information corresponding to the condition of triggering a power headroom report, a set of parameter information corresponding to the condition of triggering a power headroom report is configured for each terminal device. Similarly, if a serving cell is used as a granularity, each group of beams of the k groups of beams is used as a granularity or a carrier is used as a granularity, a set of configuration parameters is respectively configured for each serving cell or for each group of beams of the k groups of beams or for one carrier.

Correspondingly, in both configuration of the uplink power control parameter and configuration of the parameter information corresponding to the condition of triggering a power headroom report, if each group of beams of the k groups of beams is used as a granularity, a configuration parameter further includes: an identifier/a label that identifies each group of beams of the k groups of beams; or an identifier/a label of a signal that identifies each group of beams of the k groups of beams.

Before step 350, the method may further include: step 360: Determine, according to parameter information corresponding to the condition of triggering a power headroom report, whether at a current moment a terminal device side meets the condition of triggering a power headroom report, and trigger the power headroom report only when the terminal device side meets the condition of triggering a power headroom report. The parameter information corresponding to the condition of triggering a power headroom report includes: a trigger period of the power headroom report, a period of prohibiting triggering of the power headroom report, and a downlink path loss value.

Correspondingly, the condition of triggering a power headroom report includes one of the following conditions:

1) a current moment is a time corresponding to the period of triggering a power headroom report;

2) a current moment falls outside the period of prohibiting triggering of a power headroom report, and at the current moment, a downlink path loss of any beam in the beam set is greater than a downlink path loss threshold;

3) a current moment falls outside the period of prohibiting triggering of a power headroom report, and at the current moment, a downlink path loss corresponding to each of m beams is greater than a downlink path loss threshold, where the m beams are a subset of the beam set, m is a positive integer greater than or equal to 2 and less than or equal to n, and in this case, n is a positive integer greater than or equal to 2;

4) a current moment falls outside the period of prohibiting triggering of a power headroom report, and at the current moment, an average value or a weighted average value of downlink path losses corresponding to beams in the beam set is greater than a downlink path loss threshold; or 5) a current moment falls outside the period of prohibiting triggering of a power headroom report, and at the current moment, a downlink path loss of a preset beam in the beam set is greater than a downlink path loss threshold.

For the conditions 1) to 5), one beam or multiple beams in the beam set are used as an example for description. During actual application, other similar scenarios may further be applied. For example, if the beam set appears in a form of k groups, in this case, one beam in the conditions 1) to 5) may be replaced with "a group of beams", "multiple beams" may be replaced with "multiple groups of beams", and the like. Certainly, only two different combinations are used as examples. The present invention may similarly include another form of a trigger condition and similar to the foregoing two trigger conditions. For example, a set of conditions of triggering a power headroom report may be set for multiple beams received by a terminal, a set of conditions of triggering a power headroom report is set for all beams in one serving cell, or the like.

In one specific example, a first timer, for example, a timer of a periodic power headroom report, is set for each beam in the beam set. The timer is configured to determine whether a current moment is a time corresponding to the period of triggering a power headroom report. For example, a period is 10 ms. In this case, after being started, the timer expires 10 ms later, the power headroom report may be triggered, and the timer restarts at an interval of 10 ms. Alternatively, in a second case, at the same time when a second timer is set, a downlink path loss threshold corresponding to each beam in the beam set is set. The second timer is used to set the period of prohibiting triggering of a power headroom report, and is, for example, a prohibitPHR-Timer. The two parameters are set to avoid that if the power headroom report exceeds a threshold multiple times within a period of time, the power headroom report is frequently triggered, and consequently the load on the terminal device side is increased and resources are wasted. For example, the second timer sets that a period of prohibiting triggering of a power headroom report is one hour, after the UE sends one PHR, the timer is started and time starts to be measured from this moment. Within one hour, even if a power headroom exceeds a threshold range within the current time range, triggering of a power headroom report needs to be prohibited. After one hour has elapsed and the timer expires, the power headroom report allows to be triggered when a power headroom of the beam exceeds the threshold range.

In the foregoing parameter, when triggering of a power headroom report is restricted according to each beam in a beam set or according to different groups in a beam set or according to a beam set, a downlink path loss corresponding to each beam or a group or the beam set needs to be estimated. The estimating the downlink path loss may include: estimating a downlink path loss corresponding to each beam in the beam set, and/or estimating a downlink path loss corresponding to each group of beams of the k groups of beams.

Specifically, the estimating a downlink path loss corresponding to each beam in the beam set includes:

estimating, according to a reference signal power and a reference signal received power that correspond to each beam in the beam set, the downlink path loss corresponding to each beam in the beam set, where the reference signal power is configured by the base station, and the reference signal received power is measured based on a channel state information-reference signal corresponding to each beam in the beam set and/or based on a beam reference signal corresponding to each beam in the beam set.

The estimating a downlink path loss corresponding to each group of beams of the k groups of beams includes:

estimating, according to a reference signal power and a reference signal received power that correspond to each group of beams of the k groups of beams, a corresponding downlink path loss bound to each group of beams of the k groups of beams, where the reference signal power is configured by the base station, and the reference signal received power is measured based on a channel state information-reference signal corresponding to each group of beams of the k groups of beams and/or based on a beam reference signal corresponding to each group of beams of the k groups of beams.

A form of measuring the reference signal received power corresponding to each beam or the reference signal received power corresponding to each group of beams of the k groups of beams includes:

performing radio resource control layer filtering, or skipping radio resource control layer filtering.

Specifically, the performing radio resource control layer filtering is: performing weighted averaging of a current reference signal received power value and a history reference signal received power value. For example, for a high-frequency beam, radio resource control layer filtering is skipped, and for a low-frequency beam, radio resource control layer filtering is performed.

The skipping radio resource control layer filtering is: the terminal device directly uses the current reference signal received power value as an eventual reference signal received power value, where the current reference signal received power value and the history reference signal received power value both mean the reference signal received power corresponding to each beam in the beam set, or both mean the reference signal received power corresponding to each group of beams of the k groups of beams.

Specifically, a period of measuring the reference signal received power may be set in one of the following forms:

the period is set to a fixed value Fms, where F is a positive integer less than or equal to 100; or a period of measuring the reference signal received power is set according to one or a combination of the following parameters, where specifically, the parameters include: a frequency or frequency band configuration, an uplink-downlink subframe configuration, a frame structure mode, a radio access mode, or a beam configuration mode. For example, a relatively short period is selected for a measurement period of a high frequency band, a relatively long period is selected for a measurement period of a low frequency band, a relatively short period is selected for a measurement period in a case of a larger proportion of downlink subframes, and a relatively short period is selected for a measurement period in a case of a smaller proportion of downlink subframes. A relatively long period is selected for a relatively wide beam in beam configuration, and a relatively short period is selected for a relatively narrow beam in beam configuration.

A radio access type includes at least one of the following parameters: a quantity of OFDM time symbols in each subframe, a subframe length, a cyclic prefix length, a cyclic prefix overhead, a coding scheme (for example, LDPC code, Turbo code, and polar code), HARQ timing, and a subcarrier interval.

A specific beam configuration mode may include at least one of the following parameters:

antenna information, a scrambling code sequence index SCID, precoding information, channel matrix information, codebook information, layer information, an antenna port quantity, an antenna port number, beam optimization capability information, effective time, effective duration, a control channel, a beam width, and a beam angle.

In addition, during estimation of the downlink path loss, content of the beam set further needs to be configured. Specifically, the configured content of the beam set may include: one or more CSI-RS/BEAM-RS configuration indices and corresponding CSI-RS/BEAM-RS configuration information, where the CSI-RS/BEAM-RS configuration information may be a combination of one or more of antenna ports count (antenna Ports Count), a resource configuration (resource Config), a subframe configuration (subframe Config), CSI-RS/beam-RS reference signal power information, or the like. The CSI-RS reference signal power information may be transmit power information, or information about a ratio of energy per resource element (Energy Per Resource Element, EPRE) to CSI-RS/beam-RSEPRE of an uplink shared channel. Alternatively, the configured content of the beam set may further include only CSI-RS/BEAM-RS configuration index information, and other configuration information and a measured beam set or beam combination are included in different radio resource control information elements (information element, IE). Further alternatively, the configured content of the beam set may further only include a beam set index of the beam set and list information of the corresponding beam identifier. The other configuration information and measurement sets are included in different radio resource control information elements. Specifically, how to estimate a downlink path loss is in the prior art. Details are not described herein again. However, the downlink path loss may be calculated based on one case in the following: a minimum downlink path loss of all beams in the beam set, or a weighted average value (different beams may have different factors, and the sum of all factors is 1) of downlink path losses of all beams, or a average value or weighted average value of m minimum downlink path losses of beams, or an average value or a weighted average value of downlink path losses of n beams in which a difference between a downlink path loss and a minimum downlink path loss does not exceed a threshold. n is less than or equal to a quantity of all beams in the beam set.

In addition, during estimation of the downlink path loss, content of the beam set further needs to be configured. Specifically, the configured content of the beam set may include: one or more CSI-RS/BEAM-RS configuration indices and corresponding CSI-RS/BEAM-RS configuration information, where the CSI-RS/BEAM-RS configuration information may be a combination of one or more of antenna ports (antenna Ports Count), a resource configuration (resource Config), a subframe configuration (subframe Config), CSI-RS/beam-RS reference signal power information, or the like. The CSI-RS reference signal power information may be transmit power information or information about a ratio of energy per resource element (Energy Per Resource Element, EPRE) to CSI-RS/beam-RSEPRE of an uplink shared channel. Alternatively, the configured content of the beam set may further include only CSI-RS/BEAM-RS configuration index information, and other configuration information and a measured beam set or beam combination are included in different radio resource control information elements (information element, IE). Further alternatively, the configured content of the beam set may further include only a cell index of a physical cell in which the beam set is located and identifier information of the corresponding physical cell. The other configuration information and measurement sets are included in different radio resource control information elements. The beam set is configured, so that during estimation of the downlink path loss, a beam whose downlink path loss is currently estimated in the beam set can be determined according to the content of the beam set. Specifically, how to estimate a downlink path loss is in the prior art. Details are not described herein again. However, the downlink path loss may be calculated based on one case in the following: a minimum downlink path loss of all beams in the beam set, or a weighted average value (different beams may have different factors, and the sum of all factors is 1) of downlink path losses of all beams, or a average value or weighted average value of m minimum downlink path losses of beams, or an average value or a weighted average value of downlink path losses of n beams in which a difference between a downlink path loss and a minimum downlink path loss does not exceed a threshold. n is less than or equal to a quantity of all beams in the beam set.

Specifically, a downlink path loss of each beam in the beam set is estimated, and actually, a downlink path loss of a downlink beam corresponding to each beam in the beam set is first estimated. Then a downlink path loss of the downlink beam is used as the downlink path loss of the beam. That is, beams in the beam set are all uplink beams.

Therefore, before the estimating a downlink path loss corresponding to each beam in the beam set, first, a downlink beam corresponding to each beam in the beam set needs to be determined. A path loss of the downlink beam is estimated. A time of each beam in the beam set is estimated according to a time of a downlink beam corresponding to the beam, and/or a frequency of each beam in the beam set is estimated according to a frequency of a downlink beam corresponding to the beam, and/or radio channel quality of each beam in the beam set is estimated according to radio channel quality of a downlink beam corresponding to the beam.

Specifically, the determining a downlink beam corresponding to each beam in the beam set, may include:

configuring, by using a radio resource control layer (dedicated signaling and/or system information) or a Media Access Control layer, specific paired beams and/or beam combinations in uplink and downlink; or configuring, for one or more beams in the beam set by using a radio resource control layer (dedicated signaling and/or system information) or a Media Access Control layer, a reference downlink beam used for evaluating radio channel quality; or obtaining, by the terminal device during initial access of a beam, and/or beam scanning, and/or beam training, a downlink beam paired with each beam in the beam set.

It should further be noted that in a specific example of the present invention, a set of uplink power control parameters may be configured for one beam set or each beam in the beam set. Optionally, a set of the foregoing uplink power control parameters may further be configured for each beam in the beam set-RS (beam: BEAM, RS: reference signal) configuration information. In this case, the uplink power control parameter configuration information and other configuration information of a correlated uplink beam set may be included in different radio resource control information elements.

Further optionally, at the same time when the power headroom, the transmit power on the uplink shared channel, and the transmit power on the physical uplink control channel that correspond to each beam in the beam set are calculated in the foregoing, a transmit power corresponding to a sounding reference symbol corresponding to each beam may further be calculated.

A specific calculation formula is shown in a formula 3-11:

$$P_{SRS,c}(i)\_{beam\_p} = \min\{P_{CMAX,c}(i), P_{SRS_{OFFSET},c}(m) + 10\log_{10}(M_{SRS,c})\_{beam\_p} + P_{O_{PUSCH},c}(j)\_{beam\_p} + \alpha_c(j) \cdot PL_{c\_beam\_p} + f_c(i)\_{beam\_p}\}, \quad (3\text{-}11)$$

where $P_{SRS_{OFFSET},c}(m)$ is a power offset value of a semi-persistent configuration of the radio resource control layer, where m may be 0, which corresponds to Type0 triggered by sending of an SRS, or m may be 1, which corresponds to Type1 triggered by sending of an SRS; $M_{SRS,c}$ is a quantity of RBs used for transmitting an SRS. For other parameters in the foregoing formulas, refer to the definitions of the foregoing parameters for estimating the transmit power that is on the uplink shared channel and that is of the $p^{th}$ beam in the beam set or the transmit power on the physical uplink control channel. Details are not described herein again.

Correspondingly, if the power headroom of the beam set in which the terminal device is located is calculated by using the k groups of beams as a reference, a transmit power corresponding to a sounding reference symbol corresponding to each corresponding group of the k groups of beams may be calculated according to a formula 3-12:

$$P_{SRS,c}(i)\_{beamq} = \min\{P_{CMAX,c}(i), P_{SRS_{OFFSET},c}(m) + 10\log_{10}(M_{SRS,c})\_{beamq} + P_{O_{PUSCH},c}(j)\_{beamq} + \alpha_c(j) \cdot PL_{c\_beamq} + f_c(i)\_{beamq}\}, \quad (3\text{-}12)$$

where $P_{SRS_{OFFSET},c}(m)$ is a power offset value of a semi-persistent configuration of the radio resource control layer, where m may be 0, which corresponds to Type0 triggered by sending of an SRS, or m may be 1, which corresponds to Type1 triggered by sending of an SRS; $M_{SRS,c}$ is a quantity of RBs used for transmitting an SRS. For other parameters in the foregoing formulas, refer to the definitions of the foregoing parameters for estimating the transmit power that is on the uplink shared channel and that is of the $q^{th}$ group of beams of the k groups of beams or the transmit power on the physical uplink control channel. Details are not described herein again.

For the power control method provided in this embodiment of the present invention, a transmit power on an uplink shared channel, a transmit power on a physical uplink control channel, and a power headroom of a beam set are calculated in a beam space, and a power headroom report is generated; and the power headroom report is sent to the base station, so that the base station adjusts a power on a terminal device side according to the power headroom report. Based on the foregoing method, problems such as increased interference between terminal devices, inadequate resource scheduling and a reduced uplink throughput that are caused by inaccurate power control can be avoided.

Figure 4:
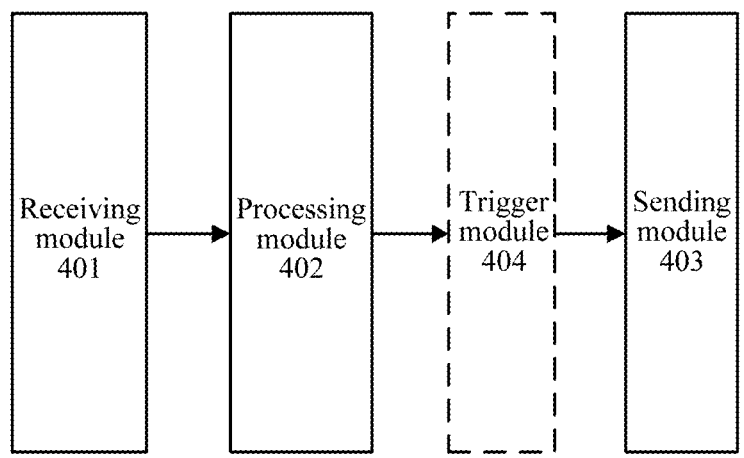
FIG. 4 is a schematic structural diagram of a virtual apparatus of a terminal device according to Embodiment 2 of the present invention.

Corresponding to the power control method provided in Embodiment 1 of the present invention, Embodiment 2 of the present invention provides a terminal device. Specifically, as shown in FIG. 4, FIG. 4 is a schematic structural diagram of a terminal device according to an embodiment of the present invention. The terminal device includes: a receiving module 401, a processing module 402, and a sending module 403.

The receiving module 401 is configured to receive configuration information sent by a base station, where the configuration information includes an uplink power control parameter.

The processing module 402 is configured to estimate, according to the uplink power control parameter, a transmit power that is on an uplink shared channel and that is of a beam set in which the terminal device is located, where the beam set includes n beams, and n is a positive integer greater than or equal to 1.

Specifically, the estimating, by the processing module 402 according to the uplink power control parameter, a transmit power that is on an uplink shared channel and that is of a beam set in which the terminal device is located may include the following two forms:

estimating, according to the uplink power control parameter, a transmit power that is on the uplink shared channel and that is of each beam in the beam set in which the terminal device is located; or estimating, according to the uplink power control parameter, a transmit power that is on the uplink shared channel and that is of each group of beams of k groups of beams in which the terminal device is located, where the k groups of beams form the beam set, and k is a positive integer greater than or equal to 1.

Then, a power headroom of the beam set in which the terminal device is located is calculated according to a maximum transmit power of the terminal device and the transmit power that is on the uplink shared channel and that corresponds to the beam set in which the terminal device is located.

Certainly, correspondingly, the following two manners may be similarly included for calculating a power headroom of the beam set in which the terminal device is located:

sequentially calculating, according to the maximum transmit power of the terminal device and a transmit power that is on the uplink shared channel and that is of a $p^{th}$ beam in the beam set, a power headroom of the $p^{th}$ beam in the beam set, until power headrooms of all beams in the beam set have been calculated, where p is a positive integer greater than or equal to I and less than or equal to n; or sequentially calculating, according to the maximum transmit power of the terminal device and a transmit power that is on the uplink shared channel and that is of a $q^{th}$ group of beams of the k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

However, the precondition for using the foregoing two manners of calculating the power headroom is that the processing module 402 determines that the terminal device does not send the uplink shared channel and a physical uplink control channel to the base station at the same time.

That is, the processing module 402 is further configured to: determine whether the terminal device sends the uplink shared channel and the physical uplink control channel to the base station at the same time; and when determining that the terminal device sends the uplink shared channel and the physical uplink control channel to the base station at the same time, calculate, according to the maximum transmit power of the terminal device, the transmit power that is on the uplink shared channel and that corresponds to the beam set in which the terminal device is located, and a transmit power that is on the physical uplink control channel and that corresponds to the beam set in which the terminal device is located, the power headroom of the beam set in which the terminal device is located.

Therefore, before this, the processing module 402 further needs to estimate, according to the uplink power control parameter, a transmit power that is on a physical uplink control channel and that corresponds to the beam set in which the terminal device is located, specifically including: estimating, according to the uplink power control parameter, a transmit power that is on the physical uplink control channel and that is of each beam in the beam set; or estimating, according to the uplink power control parameter, a transmit power that is on the physical uplink control channel and that is of each group of k groups of beams, where the k groups of beams form the beam set, and k is a positive integer greater than or equal to 1.

Similar to the foregoing manners of calculating, according to a maximum transmit power of the terminal device and the transmit power that is on the uplink shared channel and that corresponds to the beam set in which the terminal device is located, a power headroom of the beam set in which the terminal device is located, for the calculating, according to the maximum transmit power of the terminal device, the transmit power that is on the uplink shared channel and that corresponds to the beam set in which the terminal device is located, and a transmit power that is on the physical uplink control channel and that corresponds to the beam set in which the terminal device is located, the power headroom of the beam set in which the terminal device is located, the following two manners are similarly included:

sequentially calculating, according to the maximum transmit power of the terminal device, a transmit power that is on the uplink shared channel and that is of a $p^{th}$ beam in the beam set, and a transmit power that is on the physical uplink control channel and that is of the $p^{th}$ beam in the beam set, a power headroom of the $p^{th}$ beam in the beam set, until power headrooms of all beams in the beam set have been calculated, where p is a positive integer greater than or equal to 1 and less than or equal to n; or sequentially calculating, according to the maximum transmit power of the terminal device, a transmit power that is on the uplink shared channel and that is of a $q^{th}$ group of beams of the k groups of beams, and a transmit power that is on the physical uplink control channel and that is of the $q^{th}$ group of beams of the k groups of beams, a power headroom of the $q^{th}$ group of beams of the k groups of beams, until power headrooms of all groups of beams of the k groups of beams have been calculated, where q is a positive integer greater than or equal to 1 and less than or equal to k.

The sending module 403 is configured to send a power headroom report to the base station.

In addition, the configuration information may further include first control signaling, where the first control signaling is used to instruct the terminal device to configure a type of a power headroom report, and the configured type of the power headroom report includes at least one of the following:

a power headroom report that is applied to a beam technology and that is based on a beam;

a power headroom report that is applied to a beam technology and that is based on a beam group;

a first extended power headroom report that is applied to carrier aggregation and that is based on a carrier and a beam;

a second extended power headroom report that is applied to carrier aggregation and that is based on a carrier and a beam group;

a first dual connectivity power headroom report that is applied to a dual connectivity scenario and that is based on a serving cell and a beam;

a second dual connectivity power headroom report that is applied to a dual connectivity scenario and that is based on a serving cell and a beam group;

a third extended power headroom report that is applied to massive carrier aggregation and that is based on a carrier and a beam; or a fourth extended power headroom report that is applied to massive carrier aggregation and that is based on a carrier and a beam group.

After the terminal device configures the type of the power headroom report according to the first control signaling, the sending module 403 is further configured to: send power headroom report Media Access Control signaling to the base station by using a Media Access Control layer, where the power headroom report Media Access Control signaling is used to indicate that the power headroom report has been configured.

Preferably, the terminal device may further include a trigger module 404, configured to trigger the power headroom report before the sending module 403 sends the power headroom report to the base station.

Further preferably, the configuration information that is sent by the base station and that is received by the receiving module further includes parameter information corresponding to a condition of triggering a power headroom report. The trigger module 404 is further configured to: determine, according to the parameter information corresponding to the condition of triggering a power headroom report, whether at a current moment a terminal device side meets the condition of triggering a power headroom report, and trigger the power headroom report only when the terminal device side meets the condition of triggering a power headroom report. The parameter information corresponding to the condition of triggering a power headroom report includes: a trigger period of the power headroom report, a period of prohibiting triggering of the power headroom report, and a downlink path loss value.

Specifically, the condition of triggering a power headroom report includes: a current moment is a time corresponding to the period of triggering a power headroom report; or a current moment falls outside the period of prohibiting triggering of a power headroom report, and at the current moment, a downlink path loss of any beam in the beam set is greater than a downlink path loss threshold; or a current moment falls outside the period of prohibiting triggering of a power headroom report, and at the current moment, a downlink path loss corresponding to each of m beams is greater than a downlink path loss threshold, where the m beams are a subset of the beam set, m is a positive integer greater than or equal to 2 and less than or equal to n, and in this case, n is a positive integer greater than or equal to 2; or a current moment falls outside the period of prohibiting triggering of a power headroom report, and at the current moment, an average value or a weighted average value of downlink path losses corresponding to beams in the beam set is greater than a downlink path loss threshold; or a current moment falls outside the period of prohibiting triggering of a power headroom report, and at the current moment, a downlink path loss of a preset beam in the beam set is greater than a downlink path loss threshold.

A manner of configuring the uplink power control parameter may include at least one of the following:

using each beam in the beam set as a granularity;

using each group of beams of the k groups of beams as a granularity;

using a carrier as a granularity;

using a serving cell as a granularity; or using a terminal device as a granularity.

Similarly, alternatively, a manner of configuring the parameter information of the condition of triggering a power headroom report includes at least one of the following: using each beam in the beam set as a granularity;

using each group of beams of the k groups of beams as a granularity;

using a carrier as a granularity;

using a serving cell as a granularity; or using a terminal device as a granularity.

Further, during configuration of the uplink power control parameter and configuration of the parameter information corresponding to the condition of triggering a power headroom report, if each beam in the beam set is used as a granularity, the configuration parameter further includes:

an identifier/a label of a beam; or an identifier/a label of a signal that identifies a beam, where the signal that identifies the beam includes one or a combination of the following: a reference signal for the beam, a discovery signal for the beam, or a beam identifier.

Alternatively, during configuration of the uplink power control parameter and configuration of the parameter information corresponding to the condition of triggering a power headroom report, if each group of beams of the k groups of beams is used as a granularity, the configuration parameter further includes: an identifier/a label that identifies each group of beams of the k groups of beams; or an identifier/a label of a signal that identifies each group of beams of the k groups of beams.

When a trigger condition for triggering the power headroom report is determined, a downlink path loss needs to be calculated. That is, the processing module 402 is further configured to: estimate a downlink path loss corresponding to each beam in the beam set and/or estimate a downlink path loss corresponding to each group of beams of the k groups of beams.

Specifically, the estimating, by the processing module 402, a downlink path loss corresponding to each beam in the beam set may include: estimating, according to a reference signal power and a reference signal received power that correspond to each beam in the beam set, the downlink path loss corresponding to each beam in the beam set, where the reference signal received power is measured based on a channel state information-reference signal corresponding to each beam in the beam set and/or based on a beam reference signal corresponding to each beam in the beam set.

The estimating, by the processing module 402, a downlink path loss corresponding to each group of beams of the k groups of beams may specifically include: estimating, according to a reference signal power and a reference signal received power that correspond to each group of beams of the k groups of beams, a corresponding downlink path loss bound to each group of beams of the k groups of beams, where the reference signal received power is measured based on a channel state information-reference signal corresponding to each group of beams of the k groups of beams and/or based on a beam reference signal corresponding to each group of beams of the k groups of beams.

A form of measuring the reference signal received power corresponding to each beam or the reference signal received power corresponding to each group of beams of the k groups of beams includes:

performing radio resource control layer filtering, or skipping radio resource control layer filtering.

Herein, the performing radio resource control layer filtering means: performing weighted averaging of a current reference signal received power value and a history reference signal received power value.

The skipping radio resource control layer filtering means: the terminal device directly uses the current reference signal received power value as an eventual reference signal received power value, where the current reference signal received power value and the history reference signal received power value both mean the reference signal received power corresponding to each beam in the beam set, or both mean the reference signal received power corresponding to each group of beams of the k groups of beams. A period of measuring the reference signal received power may be set to a fixed value Fms, where F is a positive integer less than or equal to 100. Alternatively, the period may be set according to one or a combination of the following parameters. The parameters include: a frequency or frequency band configuration, an uplink-downlink subframe configuration, a frame structure mode, a radio access mode, or a beam configuration mode.

In both estimation of a downlink path loss of each beam in the beam set and estimation of a downlink path loss of each group of beams of the k groups of beams, the processing module 402 needs to first estimate a downlink beam corresponding to each beam in the beam set, or a downlink beam corresponding to any beam in each group of beams of the k groups of beams. That is, beams in the beam set are all uplink beams, and a downlink path loss needs to be estimated according to a downlink beam, and is then roughly used as a downlink path loss of an uplink beam. Therefore, before the estimating a downlink path loss, the processing module 402 is further configured to: determine a downlink beam corresponding to each beam in the beam set, and estimate a path loss of the downlink beam. A beam in the beam set is an uplink beam. A time of each beam in the beam set is estimated according to a time of a downlink beam corresponding to the beam, and/or a frequency of each beam in the beam set is estimated according to a frequency of a downlink beam corresponding to the beam, and/or radio channel quality of each beam in the beam set is estimated according to radio channel quality of a downlink beam corresponding to the beam.

The processing module may specifically determine a downlink beam corresponding to each beam in the beam set by using a manner of performing configuration by using a radio resource control layer or a Media Access Control layer; or configuring, for one or more beams in the beam set by using a radio resource control layer or a Media Access Control layer, a reference downlink beam used for evaluating radio channel quality; or obtaining, by the terminal device during initial access of a beam, and/or beam scanning, and/or beam training, a downlink beam paired with each beam in the beam set.

When operating, the terminal device provided in Embodiment 2 of the present invention performs the method steps performed and provided in Embodiment 1 of the present invention. For working details of the terminal device, refer to the method provided in Embodiment 1 of the present invention.

By means of the terminal device provided in Embodiment 2, a transmit power on an uplink shared channel, a transmit power on a physical uplink control channel, and a power headroom of a beam set are calculated in a beam space, and a power headroom report is generated; and the power headroom report is sent to the base station, so that the base station adjusts a power on a terminal device side according to the power headroom report. Based on the foregoing method, problems such as increased interference between terminal devices, inadequate resource scheduling and a reduced uplink throughput that are caused by inaccurate power control can be avoided.

Figure 5:
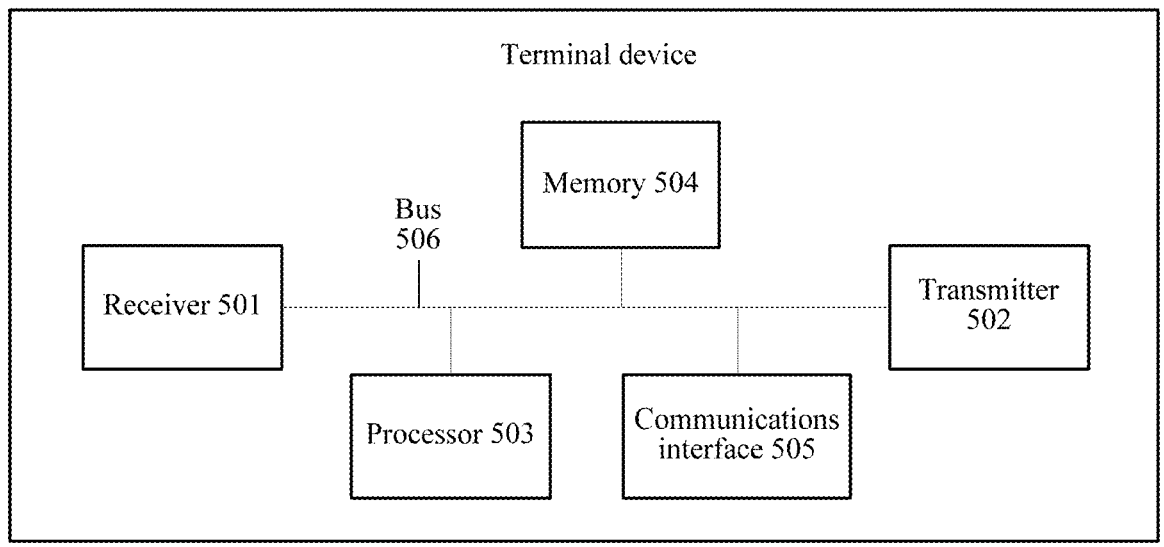
FIG. 5 is a schematic structural diagram of a physical apparatus of a terminal device according to Embodiment 3 of the present invention.

Corresponding to Embodiment 1 and Embodiment 2 of the present invention respectively, Embodiment 3 of the present invention further provides a terminal device. Specifically, as shown in FIG. 5, the terminal device includes a receiver 501, a transmitter 502, a processor 503, a memory 504, a communications interface 505, and a bus 506. The receiver 501, the transmitter 502, the processor 503, the memory 504, and the communications interface 505 in the terminal device may establish a communication connection by using the bus 506.

The receiver 501 is configured to receive configuration information sent by a base station.

The transmitter 502 is configured to: send, to the base station, a response message indicating that a power headroom report is successfully configured, and send the power headroom report to the base station.

The processor 503 may be a central processing unit (English: central processing unit, CPU for short), and is mainly configured to perform the method steps and the like corresponding to the processing module and the trigger module in Embodiment 2.

The memory 504 is configured to store an instruction executed by the processor, parameter information related to the power headroom report, and the like. The memory 504 may include a volatile memory (English: volatile memory), for example, a random-access memory (English: random-access memory, RAM for short). Alternatively, the memory may include a non-volatile memory (English: non-volatile memory), for example, a read-only memory (English: read-only memory, ROM for short), a flash memory, a hard disk drive (English: hard disk drive, HDD for short) or a solid state drive (English: solid state drive, SSD for short). The memory 504 may further include a combination of the foregoing types of memories.

Specifically, the components in the terminal device all perform the method steps provided in Embodiment 1 of the present invention. For working details of the components, refer to the method provided in Embodiment 1 of the present invention. Details are not described herein again.

Based on the foregoing technical solutions, by means of the power control method and the terminal device provided in the embodiments of the present invention, a transmit power on an uplink shared channel, a transmit power on a physical uplink control channel, and a power headroom of a beam set are calculated in a beam space, and a power headroom report is generated; and the power headroom report is sent to the base station, so that the base station adjusts a power on a terminal device side according to the power headroom report. Based on the foregoing method, problems such as increased interference between terminal devices, inadequate resource scheduling and a reduced uplink throughput that are caused by inaccurate power control can be avoided.

A person skilled in the art may be further aware that, in combination with the examples described in the embodiments disclosed in this specification, units and algorithm steps may be implemented by electronic hardware, computer software, or a combination thereof. To clearly describe the interchangeability between the hardware and the software, the foregoing has generally described compositions and steps of each example according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

Steps of methods or algorithms described in the embodiments disclosed in this specification may be implemented by hardware, a software module executed by a processing module, or a combination thereof. The software module may reside in a random-access memory (RAM), a memory, a read-only memory (ROM), an electrically programmable ROM, an electrically erasable programmable ROM, a register, a hard disk, a removable disk, a CD-ROM, or any other form of storage medium known in the art.

In the foregoing specific implementations, the objective, technical solutions, and benefits of the present invention are further described in detail. It should be understood that the foregoing descriptions are merely specific implementations of the present invention, but are not intended to limit the protection scope of the present invention. Any modification, equivalent replacement, or improvement made without departing from the spirit and principle of the present invention should fall within the protection scope of the present invention.

What is claimed is:

1. A method, comprising:
receiving, by a terminal device, configuration information from a base station, wherein the configuration information comprises an uplink power control parameter;
estimating, by the terminal device, according to the uplink power control parameter, a transmit power that is on an uplink shared channel and that is of a beam set in which the terminal device is located, wherein the beam set comprises n beams, and n is a positive integer greater than or equal to 1;
calculating, by the terminal device, according to a maximum transmit power of the terminal device and the transmit power that is on the uplink shared channel and that corresponds to the beam set in which the terminal device is located, a power headroom of the beam set in which the terminal device is located; and
generating, by the terminal device, a power headroom report according to the power headroom of the beam set in which the terminal device is located, and sending the power headroom report to the base station.

2. The method according to claim 1, further comprising:
estimating, by the terminal device, according to the uplink power control parameter, a transmit power that is on a physical uplink control channel and that corresponds to the beam set in which the terminal device is located.

3. The method according to claim 2, wherein when it is determined that the terminal device sends the uplink shared channel and the physical uplink control channel to the base station at the same time, the method further comprises:
calculating, by the terminal device, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located.

4. The method according to claim 1, wherein before the sending the power headroom report to the base station, the method further comprises: triggering the power headroom report.

5. The method according to claim 4, wherein the configuration information further comprises parameter information corresponding to a condition of triggering a power headroom report, and before the triggering the power headroom report, the method further comprises:
determining, by the terminal device, according to the parameter information corresponding to the condition of triggering a power headroom report, whether at a current moment a terminal device side meets the condition of triggering a power headroom report, and triggering the power headroom report only when the terminal device side meets the condition of triggering a power headroom report, wherein
the parameter information corresponding to the condition of triggering a power headroom report comprises:
a trigger period of the power headroom report, a period of prohibiting triggering of the power headroom report, and a downlink path loss value.

6. The method according to claim 5, wherein the condition of triggering a power headroom report comprises:
a current moment is a time corresponding to the period of triggering a power headroom report; or
a current moment falls outside the period of prohibiting triggering of a power headroom report, and at the current moment, a downlink path loss of any beam in the beam set is greater than a downlink path loss threshold; or
a current moment falls outside the period of prohibiting triggering of a power headroom report, and at the current moment, a downlink path loss corresponding to each of m beams is greater than a downlink path loss threshold, wherein the m beams are a subset of the beam set, m is a positive integer greater than or equal to 2 and less than or equal to n, and in this case, n is a positive integer greater than or equal to 2; or
a current moment falls outside the period of prohibiting triggering of a power headroom report, and at the current moment, an average value or a weighted average value of downlink path losses corresponding to beams in the beam set is greater than a downlink path loss threshold; or
a current moment falls outside the period of prohibiting triggering of a power headroom report, and at the current moment, a downlink path loss of a preset beam in the beam set is greater than a downlink path loss threshold.

7. The method according to claim 5, wherein before the triggering the power headroom report, the method further comprises: estimating a downlink path loss corresponding to each beam in the beam set or estimating a downlink path loss corresponding to each group of beams of the k groups of beams.

8. The method according to claim 1, wherein a manner of configuring the uplink power control parameter comprises at least one of the following:
using each beam in the beam set as a granularity;
using each group of beams of the k groups of beams as a granularity;
using a carrier as a granularity;
using a serving cell as a granularity; or
using a terminal device as a granularity.

9. An apparatus, comprising:
a processor; and
a non-transitory memory coupled to the processor for storing program instructions,
wherein the program instructions, when executed by the processor, cause the apparatus to:
receive configuration information from a base station, wherein the configuration information comprises an uplink power control parameter;
estimate, according to the uplink power control parameter, a transmit power that is on an uplink shared channel and that is of a beam set in which the terminal device is located, wherein the beam set comprises n beams, and n is a positive integer greater than or equal to 1;
calculate, according to a maximum transmit power of the terminal device and the transmit power that is on the uplink shared channel and that corresponds to the beam set in which the terminal device is located, a power headroom of the beam set in which the terminal device is located; and
generate a power headroom report according to the power headroom of the beam set in which the terminal device is located; and
send the power headroom report to the base station.

10. The apparatus according to claim 9, wherein the program instructions further cause the apparatus to:
estimate, according to the uplink power control parameter, a transmit power that is on a physical uplink control channel and that corresponds to the beam set in which the terminal device is located.

11. The apparatus according to claim 10, wherein the program instructions further cause the apparatus to:
determine whether the terminal device sends the uplink shared channel and the physical uplink control channel to the base station at the same time; and
when determining that the terminal device sends the uplink shared channel and the physical uplink control channel to the base station at the same time, calculate, according to the maximum transmit power of the terminal device, the transmit power that is on the uplink shared channel and that corresponds to the beam set in which the terminal device is located, and the transmit power that is on the physical uplink control channel and that corresponds to the beam set in which the terminal device is located, the power headroom of the beam set in which the terminal device is located.

12. The apparatus according to claim 9, wherein the program instructions further cause the apparatus to:
trigger the power headroom report.

13. The apparatus according to claim 12, wherein the configuration information further comprises parameter information corresponding to a condition of triggering a power headroom report, and the program instructions further cause the apparatus to:
determine, according to the parameter information corresponding to the condition of triggering a power headroom report, whether at a current moment a terminal device side meets the condition of triggering a power headroom report, and trigger the power headroom report only when the terminal device side meets the condition of triggering a power headroom report, wherein the parameter information corresponding to the condition of triggering a power headroom report comprises:
a trigger period of the power headroom report, a period of prohibiting triggering of the power headroom report, and a downlink path loss value.

14. The apparatus according to claim 13, wherein the condition of triggering a power headroom report comprises:
a current moment is a time corresponding to the period of triggering a power headroom report; or
a current moment falls outside the period of prohibiting triggering of a power headroom report, and at the current moment, a downlink path loss of any beam in the beam set is greater than a downlink path loss threshold; or
a current moment falls outside the period of prohibiting triggering of a power headroom report, and at the current moment, a downlink path loss corresponding to each of m beams is greater than a downlink path loss threshold, wherein the m beams are a subset of the beam set, m is a positive integer greater than or equal to 2 and less than or equal to n, and in this case, n is a positive integer greater than or equal to 2; or
a current moment falls outside the period of prohibiting triggering of a power headroom report, and at the current moment, an average value or a weighted average value of downlink path losses corresponding to beams in the beam set is greater than a downlink path loss threshold; or
a current moment falls outside the period of prohibiting triggering of a power headroom report, and at the current moment, a downlink path loss of a preset beam in the beam set is greater than a downlink path loss threshold.

* * * * *